US009019583B2

(12) United States Patent
Wu

(10) Patent No.: US 9,019,583 B2
(45) Date of Patent: Apr. 28, 2015

(54) MOBILE TERMINALS AND METHODS FOR GENERATING ELECTRONIC DOCUMENTS FOR THE SAME

(71) Applicant: Tencent Technology (Shenzhen) Company Limited, Shenzhen (CN)

(72) Inventor: Shi Xiang Wu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/081,941

(22) Filed: Nov. 15, 2013

(65) Prior Publication Data

US 2014/0078559 A1 Mar. 20, 2014

Related U.S. Application Data

(63) Continuation of application No. PCT/CN2013/080384, filed on Jul. 30, 2013.

(30) Foreign Application Priority Data

Aug. 27, 2012 (CN) .......................... 2012 1 0307666

(51) Int. Cl.
*H04N 1/46* (2006.01)
*H04N 1/04* (2006.01)
*G06K 9/00* (2006.01)
(52) U.S. Cl.
CPC ... *H04N 1/04* (2013.01); *G06K 9/00* (2013.01)
(58) Field of Classification Search
USPC ......................................................... 358/537
See application file for complete search history.

(56) References Cited

U.S. PATENT DOCUMENTS

2004/0179213 A1 9/2004 Oba
2012/0320409 A1* 12/2012 Kakegawa ................... 358/1.15

FOREIGN PATENT DOCUMENTS

| CN | 1426017 | 6/2003 |
|---|---|---|
| CN | 1533202 | 9/2004 |
| CN | 101084851 | 12/2007 |
| CN | 101350870 | 1/2009 |
| CN | 101441713 | 5/2009 |
| CN | 101808046 | 8/2010 |

OTHER PUBLICATIONS

International Search Report and Written Opinion mailed Nov. 7, 2013, directed to International Application No. PCT/CN2013/080384; 10 pages.

* cited by examiner

*Primary Examiner* — Charlotte M Baker
(74) *Attorney, Agent, or Firm* — Morrison & Foerster LLP

(57) ABSTRACT

A method of generating an electronic document for mobile terminals is described. The method includes: obtaining a target image to be scanned and recognized; performing image and text scanning and recognition on the target image and obtaining a scanning and recognition result; generating an electronic document based on the scanning and recognition result. A mobile terminal is also described. According to the method, a user can generate electronic documents from information of interest to the user whenever and wherever, using a mobile terminal, thereby greatly enhancing the capability of the user to obtain information while traveling.

16 Claims, 21 Drawing Sheets

MOBILE TERMINALS AND METHODS FOR GENERATING ELECTRONIC DOCUMENTS FOR THE SAME

CROSS REFERENCE TO RELATED APPLICATION

This application is a U.S. national application under 35 U.S.C. §111(a) claiming priority, under 35 U.S.C. §120, to International Application No. PCT/CN2013/080384 filed on Jul. 30, 2013, which claims the priority benefit of Chinese Patent Application No. 201210307666.2, filed Aug. 27, 2012, the contents of both the PCT application and the Chinese application are incorporated by reference herein in their entirety for all purposes.

TECHNICAL FIELD

The present disclosure relates generally to the technological field of electronics, and more particularly, to mobile terminals and methods for generating electronic documents for the same.

BACKGROUND

Today, the pace of life is ever increasing and obtaining information whenever and wherever possible has become part of people's daily life. When a user reads a newspaper, a magazine, a poster, or a bulletin board on the road, and finds an article of interest, there is usually a need to take down the information provided by the article. This can be done by writing down the information in the article. However, it is time-consuming to write down the information and, given the circumstances, most people would find it impossible to write down more than a few words, let alone a paragraph or an entire article.

One way to solve the problem is to take a picture of the article using a mobile terminal, e.g., a mobile phone. In some circumstances, taking a picture of what a user sees on the road is the only way to save the information for future reference. For example, when an article or a poster contains any picture, the only practical way to copy the picture on the go is to take a picture of it using a mobile terminal. Many mobile phones nowadays are equipped with integrated digital cameras, which can be used to snap quick shots. Pictures taken in this way are usually stored as image files, such as files with extensions .jpg, .bmp., .png, and .tif., initially in the mobile terminal's internal memory or hard drive, or in an external memory or hard drive connected to the mobile terminal, e.g., a compact flash ("CF") card, a secure digital ("SD") card, a mini SD card, or a micro SD card. A user can then connect the mobile terminal to a personal computer ("PC"), which usually has a larger memory, larger hard drive, more processing power, and a larger display, and transfer the image files stored in the mobile terminal or the external memory or hard drive connected thereto to the PC. Alternatively, the user can disconnect any medium connected to the mobile terminal and used to store the relevant image files and reconnect it to a PC, thereby transferring the image files stored in the medium to the PC.

Once a picture file is transferred to a PC, a user can further process it using the PC. For example, any text in the picture file may be converted to text in a different file format using a software application with optical character recognition ("OCR") function. The image file itself or the text extracted by the OCR software can be further posted online by the user using the PC. The time lapse from the time a picture is taken using the mobile terminal to the time the corresponding image file is further processed by the user using a PC can be very long. Most users do not regularly transfer files from their mobile terminals to PCs, and even if they do, they usually do not immediately process the files on the PC once transferred. This is counterproductive because often times the very reason that a user wants to take the information down on the road is to be able to add his/her thoughts to it and quickly share the information and the thoughts with friends or other contacts. There is a need for instant image file processing and OCR on the go so that a user does not lose her thoughts and does not have to wait until she can have access to a PC connected to the Internet.

There are primitive OCR products for mobile terminals. They can provide basic OCR functionalities which do not go beyond business card recognition. For example, they can allow a user to take a picture of a business card, perform OCR on the image file showing the business card, and allow the user to save relevant recognized information in relevant fields in the mobile terminal's address book. Even though these products allow limited editing of the recognized information, e.g., to correct OCR mistakes, they do not allow users to edit the captured information extensively, and they do not support advanced editing options such as text-image mixed editing and compilation. Often limited by the mobile terminal's processing power, a user will still need to transfer the image files to a PC to do subsequent editing and processing. There is a need for mobile terminals to provide on-the-go image capture, OCR, editing, and sharing functionalities to enrich users' experience.

SUMMARY OF THE DISCLOSURE

One of the technical problems to be solved by embodiments of the present disclosure is to provide methods for generating electronic documents using mobile terminals and mobile terminals that can be used in the methods. The mobile terminals' capability to obtain information in real time can be greatly enhanced by allowing users to obtain electronic documents by scanning and recognizing images using the mobile terminals.

To solve the above-identified technical problem, an embodiment of the disclosure provides a method of generating an electronic document using a mobile terminal, the method comprising:

obtaining a target image to be scanned and recognized;

performing text and image scanning and recognition of the target image, thereby obtaining a scanning and recognition result;

generating the electronic document in accordance with the scanning and recognition result.

Accordingly, another embodiment of the disclosure provides a mobile terminal comprising:

a target image obtaining module that obtains a target image to be scanned and recognized;

a scanning and recognition module that performs image and text scanning and recognition of the target image, thereby obtaining a scanning and recognition result;

an electronic document generating module that generates an electronic document in accordance with the scanning and recognition result.

By scanning and recognizing target images using a mobile terminal, a user can generate electronic documents based on information of interest to the user at any time and any place using a mobile terminal. This greatly enhances the convenience for the user to obtain information on the go, especially when traveling.

DETAILED DESCRIPTION

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 1:
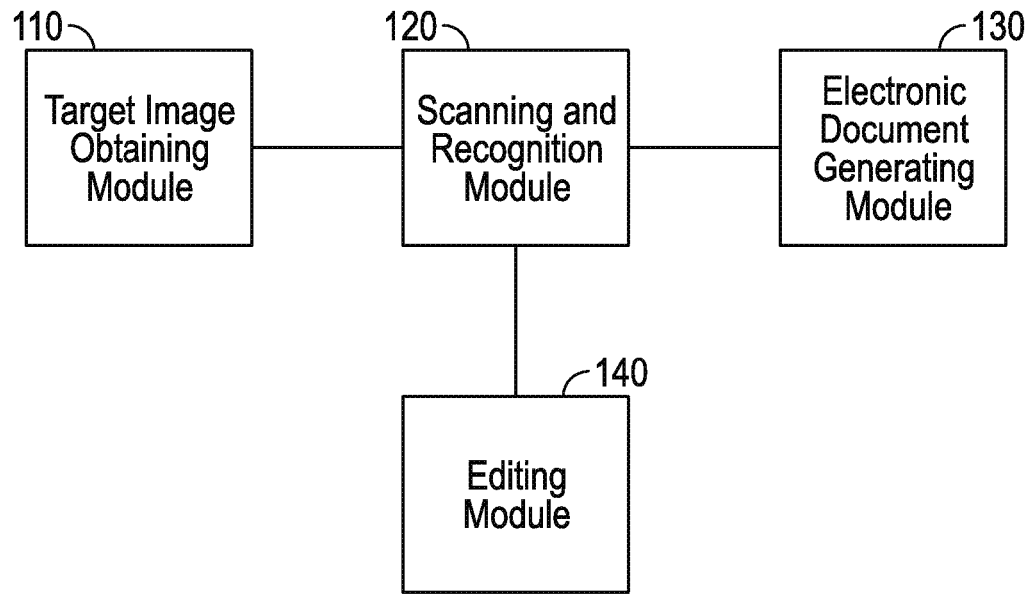
FIG. 1 is a schematic diagram illustrating an example of an arrangement of a mobile terminal according to various embodiments.

FIG. 1 is a schematic diagram illustrating an example of an arrangement of a mobile terminal according to various embodiments. Examples of a mobile terminal can include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to those skilled in the art.

Figure 2:
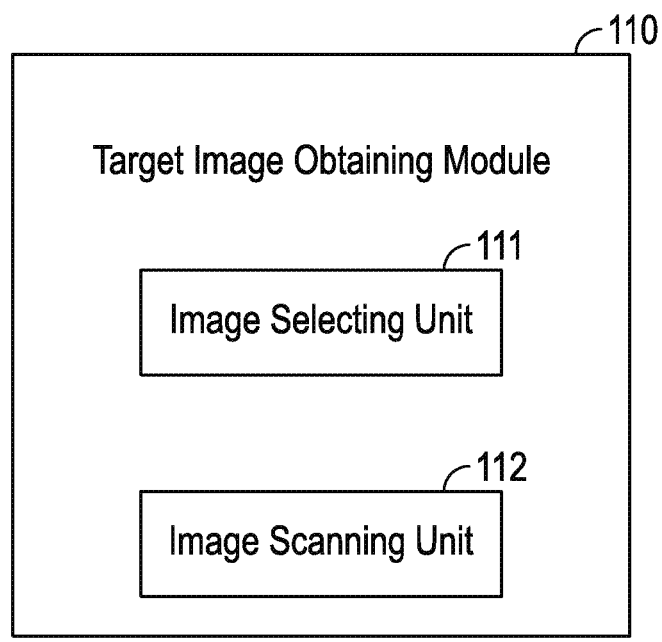
FIG. 2 is a schematic diagram illustrating an example of an arrangement of a target image obtaining module according to various embodiments.

According to some embodiments, a mobile terminal can comprise a target image obtaining module 110, configured to obtain a target image to be scanned and recognized, the target image being the image for which an electronic document is to be generated. According to various embodiments, a target image can be an image already saved in an image library in a mobile terminal, or an image that is currently being obtained by the mobile terminal through its picture taking function, e.g., an integrated digital camera. As used herein, an "image library" is a collection of image files, usually organized in folders (and subfolders) in a terminal. Many terminals, including mobile terminals, now have the capability to allow users to organize, categorize, and manage image files, e.g., by creating albums or galleries of image files stored in the mobile terminal. An image library, accordingly, can mean the entire collection of image files stored in a mobile terminal, or a collection of image files stored in one or more particularly picture folders, albums, or galleries, created either by the user or by the mobile terminal by default. According to some embodiments, and as illustrated in FIG. 2, the target image obtaining module 110 can comprise at least one of an image selecting unit 111 and an image scanning unit 112.

According to some embodiments, the image selecting unit 111 can be configured to obtain at least one image selected by a user from an image library in a mobile terminal as a target image for scanning and recognition. According to some embodiments, the image selecting unit 111 can be configured to select more than one image at a time as target images for scanning and recognition, thereby allowing scanning and recognition of multiple target images concurrently and the generation of an electronic document incorporating the results of the scanning and recognition of the multiple target images.

According to some embodiments, the image scanning unit 112 can be configured to obtain an image being currently obtained by the mobile terminal and treat the image as the target image for scanning and recognition. According to some embodiments, the image scanning unit 112 can be configured to obtain an image being currently shot by a camera of the mobile terminal and treat the image as the target image for scanning and recognition.

Figure 3:
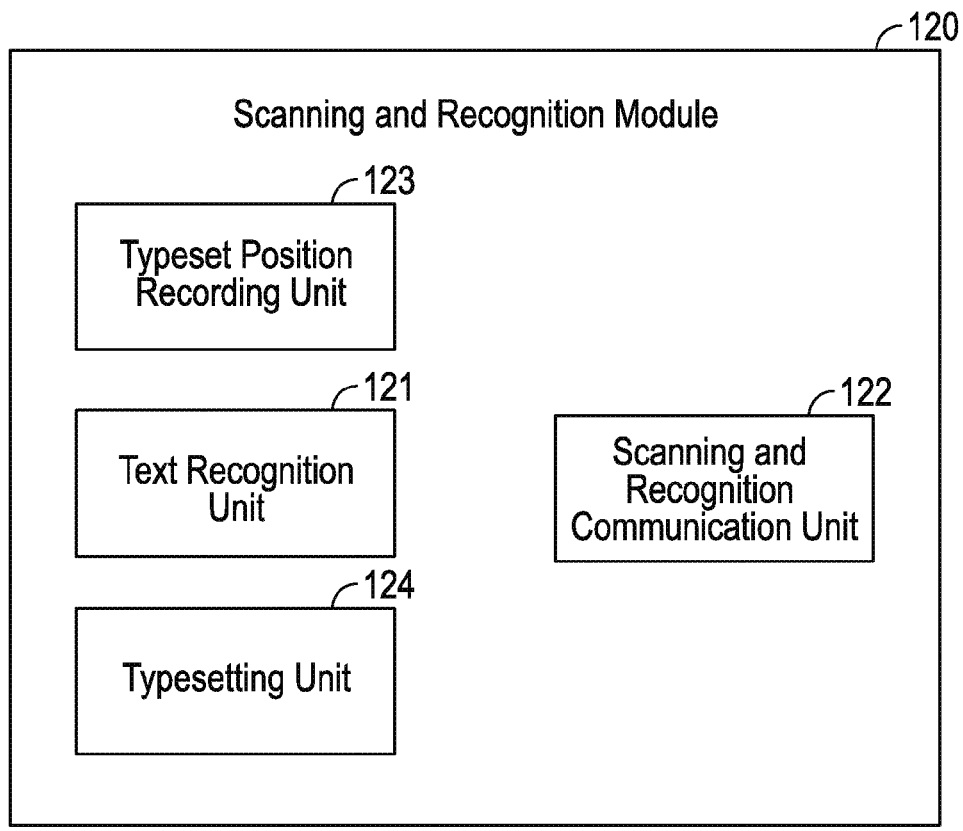
FIG. 3 is a schematic diagram illustrating an example of an arrangement of a scanning and recognition module according to various embodiments.

According to some embodiments, a mobile terminal can comprise a scanning and recognition module 120, configured to obtain a scanning and recognition result in accordance with the target image. According to some embodiments, and as illustrated in FIG. 3, the scanning and recognition module 120 can comprise at least one of a text recognition unit 121 and a scanning and recognition communication unit 122.

According to some embodiments, the text recognition unit 121 can be configured to call an algorithm for OCR to recognize text in the target image and obtain text information therefrom. Examples of an algorithm suitable for use according to these embodiments include those algorithms that can complete OCR in a minimum amount of time based on a sufficiently large sample character library, certain character classification categories, and certain pre-set recognition parameters. Such algorithms and their associated sample character libraries and character classification categories may be language-specific, but are well known to those skilled in the art in the different languages for which OCR needs to be conducted.

According to some embodiments, the scanning and recognition communication unit 122 can be configured to send a scanning and recognition request comprising a target image to a scanning and recognition server, and to receive a scanning and recognition result sent from the scanning and recognition server. According to some other embodiments, the scanning and recognition communication unit 122 can be configured to send via a server a scanning and recognition request comprising a target image to another terminal capable of scanning and recognition of the target image. According to yet some other embodiments, the scanning and recognition communication unit 122 can be configured to send a scanning and recognition request comprising a target image directly to another terminal capable of scanning and recognition of the target image. According to some embodiments, the other terminal is also a mobile terminal. According to some other embodiments, the other terminal is a non-mobile terminal. As used herein, a "non-mobile terminal" refers to a terminal not susceptible to frequent moves, e.g., a desktop PC, although it is not impossible to move the terminal. The connection between a mobile terminal and a server can be via the Internet, a local area network, mobile phone communication networks such as GSM, CDMA, TDMA, EDGE, GPRS, 2G, 3G, LTE, 4G, or any other method connecting a terminal to a server, which methods are well known to those skilled in the art. The connection between a mobile terminal and another terminal is also well known to those skilled in the art, and can be via the Internet, a local area network, mobile phone communication networks such as GSM, CDMA, TDMA, EDGE, GPRS, 2G, 3G, LTE, 4G, or any other method connecting two terminals, such as via a WiFi network, or such short-distance direct wireless connections as Bluetooth, infrared, or near field communication.

According to some embodiments, the scanning and recognition module 120 can comprise a typeset position recording unit 123 and a typesetting unit 124. According to some embodiments, the typeset position recording unit 123 can be configured to record typeset position of text in a target image. As used herein, "typeset position" means the relative location within a target image where certain information appears. For example, a typeset position of text in a target image means the location(s) within the target image where certain characters appear. Typeset positions can be expressed and/or determined by using a set of typeset coordinates in an image. For example, in the case of a rectangle image having a top edge, a bottom edge, a left edge, and a right edge, the typeset position of a character can be expressed and/or determined by the respective distances between (i) the top edge of the character and the top edge of the image; (ii) the bottom edge of the character and the bottom edge of the image; (iii) the left edge of the character and the left edge of the image; and (iv) the right edge of the character and the right edge of the image. Such distances are often expressed in inches, but can also be expressed in other measures, all of which are well known to those skilled in the art. According to some embodiments, the scanning and recognition module 120 can be configured to treat non-text areas of a target image as image areas and retain them as a part of a scanning and recognition result. As used herein, a "non-text area" is an area of a target image in which the scanning and recognition module 120 cannot identify any text, and a "text area" is an area of a target image in which the scanning and recognition module 120 can identify text. Those skilled in the art are well aware of the methods to determine the boundary between a text area and a non-text area. For example, if the distance between two blocks of text in each of which characters are placed in close proximity to each other is above a certain pre-set threshold, then the two blocks of text can be treated by the scanning and recognition module as two separate text areas and the area in between and connecting them can be treated by the scanning and recognition module as a non-text area. Accordingly, a scanning and recognition result can comprise one or more text areas and/or one or more non-text areas, wherein a text area can be contiguous but not overlapping with one or more non-text areas and a non-text area can be contiguous but not overlapping with one or more text areas.

According to some embodiments, the typesetting unit 124 can be configured to typeset the text information obtained by the text recognition unit 121 in accordance with the typeset position of the corresponding text in the target image as recorded by the typeset position recording unit 123. According to some embodiments, the typesetting unit 124 can be configured to typeset the text information obtained by the text recognition unit 121 in accordance with the typeset position of the corresponding text in the target image as recorded by the typeset position recording unit 123, such that the text information in a scanning and recognition result after typesetting occupies relatively the same position in the scanning and recognition result as the corresponding text occupies in the target image.

Figure 4:
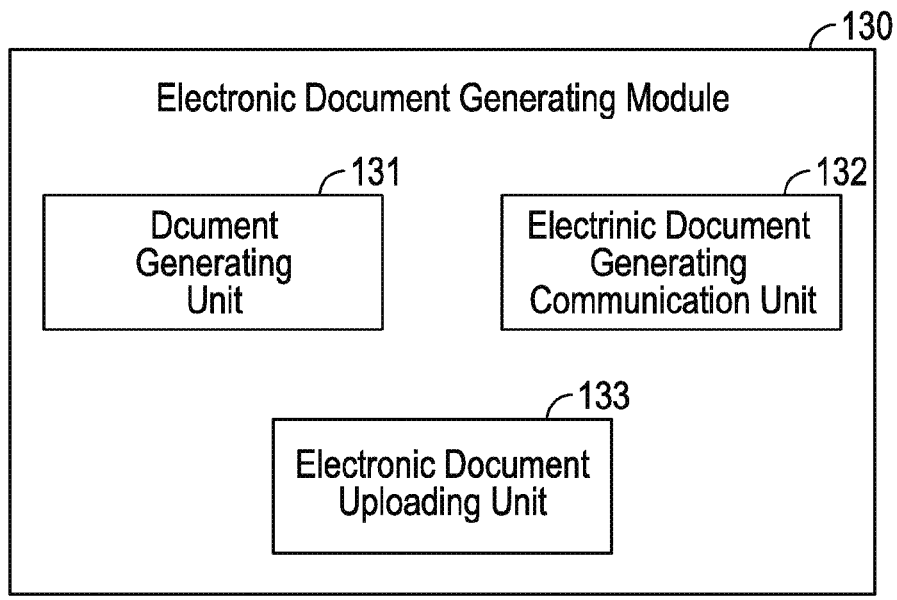
FIG. 4 is a schematic diagram illustrating an example of an arrangement of an electronic document generating module according to various embodiments.

According to some embodiments, a mobile terminal can comprise an electronic document generating module 130, configured to obtain electronic documents in accordance with scanning and recognition results. According to some embodiments, and as illustrated in FIG. 4, the electronic document generating module 130 can comprise at least one of a document generating unit 131 and an electronic document generating communication unit 132.

According to some embodiments, the document generating unit 131 can be configured to generate electronic documents in a pre-set or user customized format in accordance with a scanning and recognition result. Examples of formats of electronic documents can include, but are not limited to, editable electronic document formats such as Microsoft Word format, Microsoft PowerPoint format, and Adobe Acrobat's PDF format. According to some embodiments, the document generating unit 131 can be configured to generate electronic documents in accordance with a scanning and recognition result in a pre-set, default format. According to some other embodiments, the document generating unit 131 can be configured to generate electronic documents in accordance with a scanning and recognition result in a format selected by a user. According to some embodiments, electronic documents can be transferred between terminals or between a terminal and a server in the form of character strings, either with or without encryption.

According to some embodiments, the electronic document generating communication unit 132 can be configured to send an electronic document generating request comprising a scanning and recognition result to an electronic document generating server, and to receive from the electronic document generating server an electronic document generated by the electronic document generating server in accordance with the electronic document generating request. According to some other embodiments, the electronic document generating communication unit 132 can be configured to send an electronic document generating request comprising a scanning and recognition result to another terminal via a server, the other terminal capable of generating electronic documents in accordance with scanning and recognition results. According to yet some other embodiments, the electronic document generating communication unit 132 can be configured to send an electronic document generating request comprising a scanning and recognition result directly to another terminal capable of generating electronic documents in accordance with scanning and recognition results. According to some embodiments, the other terminal is also a mobile terminal. According to some other embodiments, the other terminal is a non-mobile terminal. Methods of connecting a mobile terminal and a server are well known to those skilled in the art, some of which have been described in detail hereinabove. Methods of connecting a mobile terminal and another terminal are also well known to those skilled in the art, some of which have been described in detail hereinabove.

According to some embodiments, the electronic document generating module 130 can comprise an electronic document uploading unit 133, configured to upload an electronic document generated as described above to a server. According to some embodiments, the electronic document uploading unit 133 can be configured to upload an electronic document thus generated to a cloud space in a server, thereby allowing a user to obtain the generated electronic document from the cloud space in the server by logging in a related account from a different terminal than the mobile terminal from which the electronic document has been uploaded.

According to some embodiments, a mobile terminal can comprise an editing module 140, configured to display a scanning and recognition result, and to edit the scanning and recognition result in accordance with one or more edit operations obtained from a user. According to some embodiments, editing a scanning and recognition result comprises editing text information as a result of OCR of a target image. According to some other embodiments, editing a scanning and recognition result comprises editing images in non-text areas treated as image areas and retained as a part of a scanning and recognition result. Examples of editing text information include, but are not limited to, proofreading recognized text against the original text in a target image, adjusting the position of text information in a scanning and recognition result, adjusting the font, size, color, and/or other attributes of one or more characters, italicizing, bolding, underlining, striking through, superscripting, subscripting, and adding text information to the scanning and recognition result. Examples of editing images include, but are not limited to, adjusting the size, brightness, contrast, and/or other attributes of an image, cropping an image, adjusting the position of an image in a scanning and recognition result, and adding text on top of the image. Those skilled in the art are well aware of the methods of both text editing and image editing.

According to some embodiments, more than one target image can be scanned and recognized by the scanning and recognition module 120, either in a pre-set order (e.g., in the order in which they were obtained by the mobile terminal or saved into the mobile terminal) or in a customizable order, or simultaneously (e.g., a user can select a number of target images already stored in the mobile terminal and apply scanning and recognition of them by providing one user command). As a result, more than one scanning and recognition result is produced. According to these embodiments, the editing module 140 can be configured to allow a user to edit more than one scanning and recognition result obtained from scanning and recognition of the more than one target image. Examples of editing more than one scanning and recognition result include, but are not limited to, copying and pasting text or image from one result to another result, deleting one or more results, and combining two or more results into a larger result. This is particularly desirable when an article of interest to a user has too many characters or is too large in size to be captured by a mobile terminal's camera into only one image file. Instead of taking only one picture of the article and attempting to apply OCR to the image file containing many characters, different portions of the article can be captured into different image files using the mobile terminal's camera. A user can then select and apply OCR to these image files stored in the mobile terminal and combine the recognized results into a bigger result, thereby restoring the information of the article and preserving the relative positions of text and images in the article.

Figure 5:
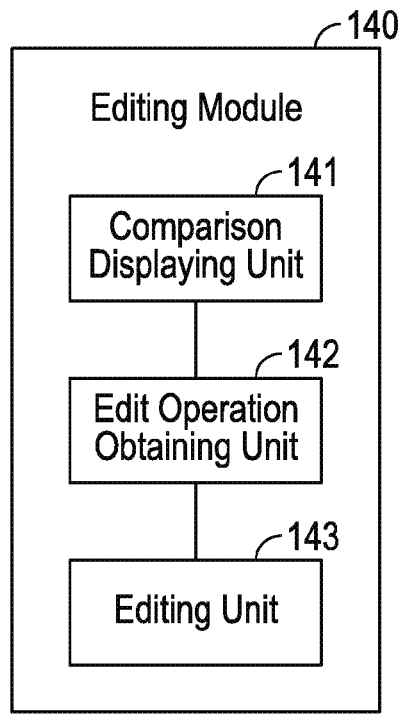
FIG. 5 is a schematic diagram illustrating an example of an arrangement of an editing module according to various embodiments.

According to some embodiments, and as illustrated in FIG. 5, the editing module 140 can comprise: a comparison displaying unit 141, an edit operation obtaining unit 142, and an editing unit 143.

Figure 9A:
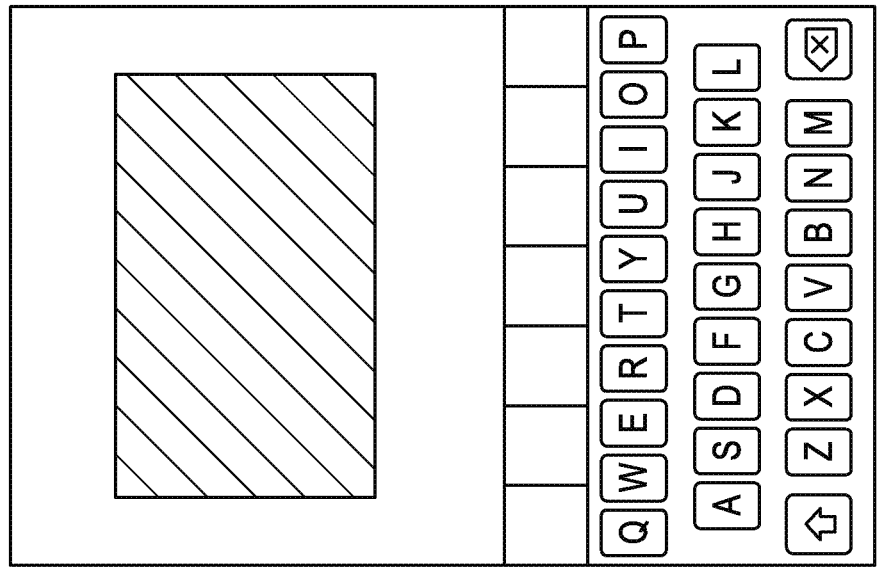
FIG. 9A is a schematic diagram illustrating an example of effect of a comparison interface according to various embodiments.
Figure 9A:
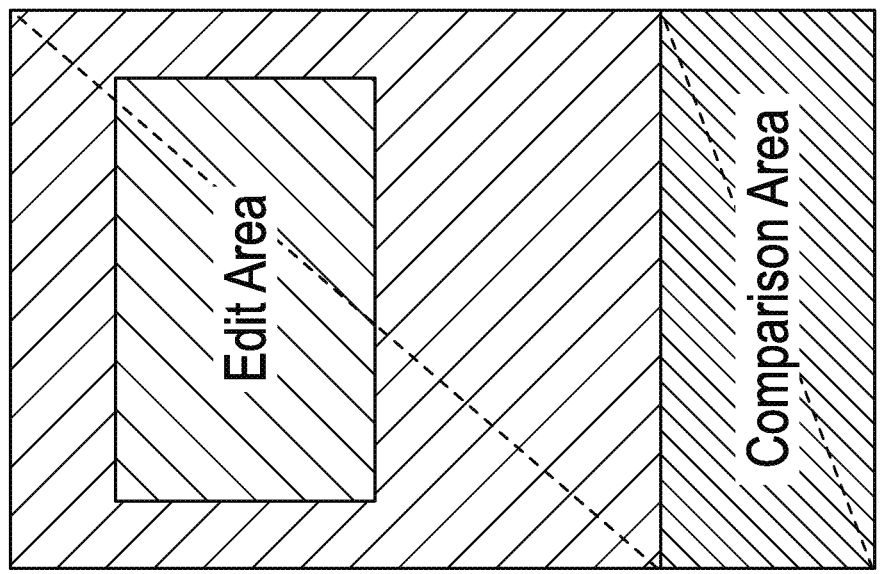

According to some embodiments, the comparison displaying unit 141 can be configured to display a comparison interface comparing a scanning and recognition result of a target image to the target image. FIG. 9A is a schematic diagram illustrating an example of effect of a comparison interface according to various embodiments, wherein both the scanning and recognition result and the target image are displayed in an editing interface, thereby allowing a user to perform edit operations specific to the scanning and recognition result.

According to some embodiments, the edit operation obtaining unit 142 can be configured to obtain a user's editing operations specific to a scanning and recognition result. A user can input edit operation commands via keys or a touch screen of a mobile terminal to edit a scanning and recognition result displayed on an editing interface. Methods of inputting such commands are well known to those skilled in the art. Of course a user does not have to edit a scanning and recognition result to make it resemble a target image either in terms of typesetting or in terms of content. Rather, the user can freely edit the scanning and recognition result as she wishes in preparation for an electronic document with typesetting and content that may be different from those in the target image.

Figure 9B:
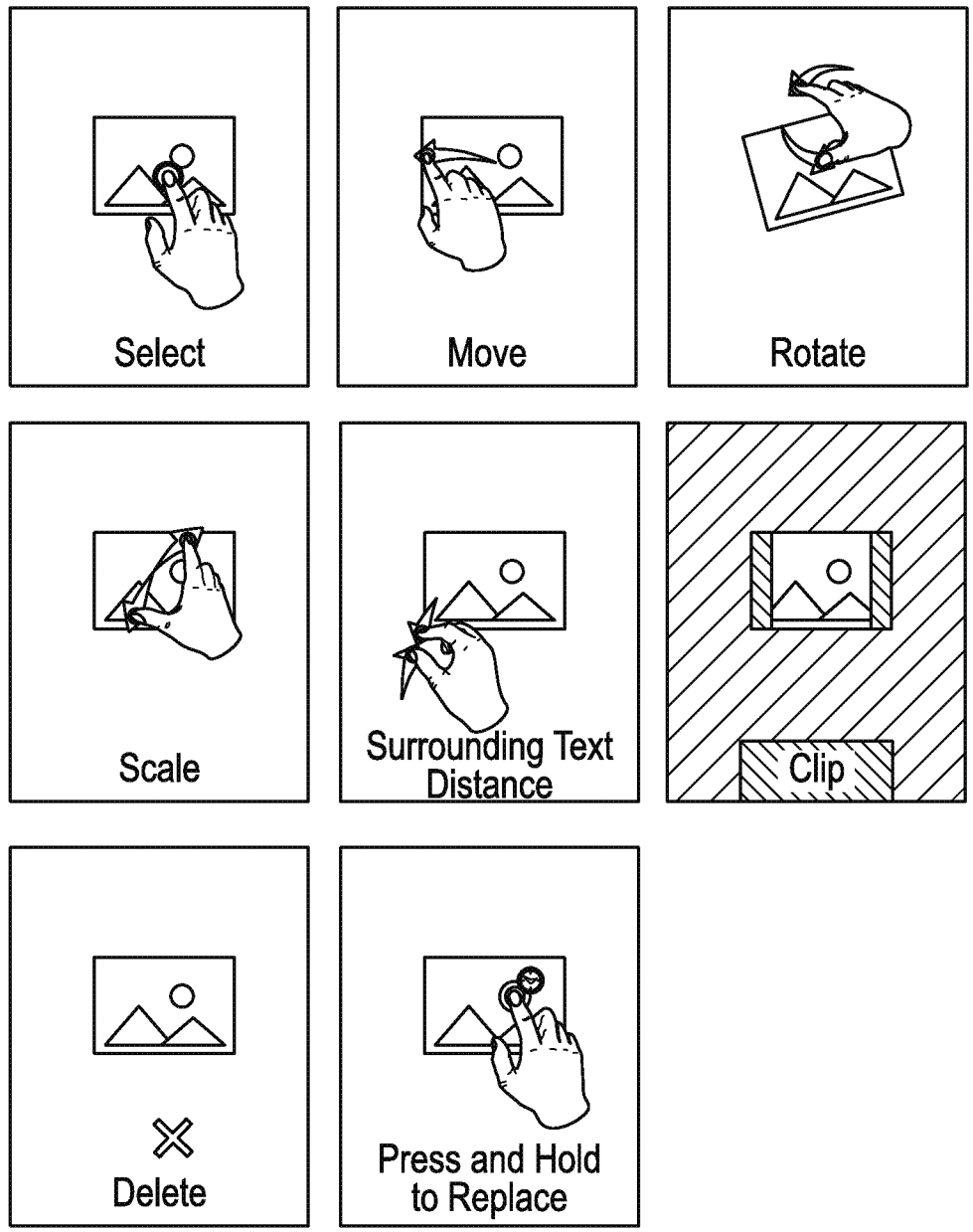
FIG. 9B is a schematic diagram illustrating examples of methods of inputting image editing commands using a touch-screen.

According to these embodiments, the function of the comparison interface is less for the user to edit the scanning and recognition result in accordance with the target image, but to provide the target image as a reference for the user to proofread the scanning and recognition result. In addition to the methods of editing text and images described above, a user can edit text and images in a scanning and recognition result by selecting, moving, dragging and dropping, rotating, scaling, clipping, copying and pasting, deleting and/or replacing text and or images in the scanning and recognition result. FIG. 9B is a schematic diagram illustrating examples of methods of inputting image editing commands using a touchscreen. These methods are well known to those skilled in the art and can be used to edit images in a scanning and recognition result according to various embodiments of the present disclosure. Editing operations pursuant to some of these commands, e.g., selecting, moving, and rotating, are carried out automatically upon the entry of the commands. Other editing operations pursuant to certain commands, e.g., deleting and replacing, usually need a user confirmation before being carried out, e.g., a prompt message asking the user to confirm deletion or a window for the user to select an image to replace the existing image in the scanning and recognition result.

According to some embodiments, the editing unit 143 can be configured to edit a scanning and recognition result in accordance with operations obtained by the edit operation obtaining unit 142.

Figure 6:
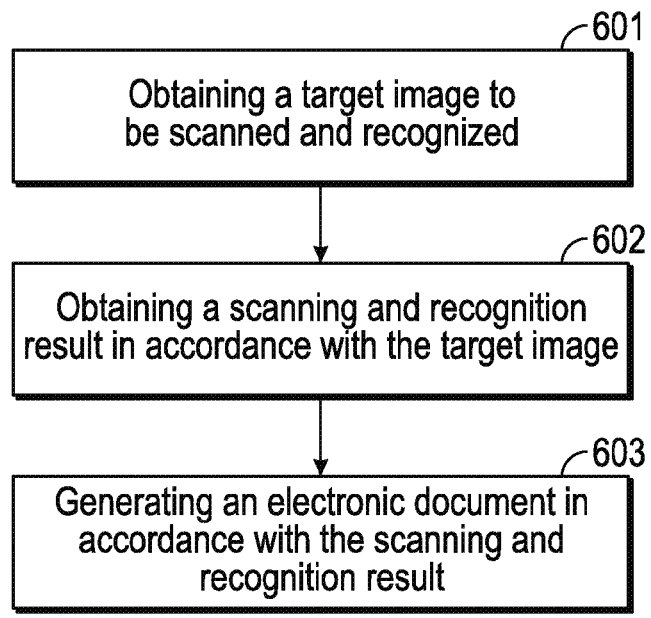
FIG. 6 is a schematic diagram illustrating an example of the flow of a method of generating electronic document for a mobile terminal according to various embodiments.

FIG. 6 is a schematic diagram illustrating an example of the flow of a method of generating electronic documents for a mobile terminal according to various embodiments. The method can comprise the following steps.

Step 601: obtaining a target image to be scanned and recognized. The target image can be an image for which a user needs to generate an electronic document. According to some embodiments, a target image for scanning and recognition can be an image already saved in an image library in a mobile terminal. A user can select one or more images stored in a mobile terminal at a time for scanning and recognition. In the case where more than one image stored in a mobile terminal is selected by a user as target images for scanning and recognition, the mobile terminal can subsequently scan and recognize the multiple images simultaneously and generate an electronic document combining the scanning and recognition results of the multiple target images. According to some other embodiments, a target image can be an image that is currently being obtained by a mobile terminal through its picture taking function. For example, a user can point the camera of a mobile terminal at an article in a magazine and take a picture of that article, and the picture thus obtained by the camera can be a target image for scanning and recognition.

Step 602: obtaining a scanning and recognition result in accordance with the target image. According to some embodiments, a mobile terminal can complete scanning and recognition of a target image locally. Local scanning and recognition of a target image can comprise calling an algorithm for OCR to recognize text in the target image and obtain text information therefrom. Such algorithms and their associated sample character libraries and character classification categories may be language-specific, but are well known to those skilled in the art in the different languages for which OCR needs to be conducted. Non-text areas of a target image can be treated as image areas and be retained as a part of a scanning and recognition result.

According to some other embodiments, a mobile terminal can obtain a scanning and recognition result from a scanning and recognition server, by sending a scanning and recognition request comprising a target image to the scanning and recognition server, and receiving the scanning and recognition result sent from the scanning and recognition server. According to still some other embodiments, a mobile terminal can obtain a scanning and recognition result from another terminal, by sending a scanning and recognition request comprising a target image to the other terminal, either via a server or directly, and receiving the scanning and recognition result sent from the other terminal, either via a server or directly.

Step 603: generating an electronic document in accordance with the scanning and recognition result. According to some embodiments, a mobile terminal can generate an electronic document in accordance with a scanning and recognition result in a pre-set, default format. According to some other embodiments, a mobile terminal can generate an electronic document in accordance with a scanning and recognition result in a format selected by a user.

According to some other embodiments, a mobile terminal can obtain an electronic document generated in accordance with a scanning and recognition result from an electronic document generating server, by sending an electronic document generating request comprising the scanning and recognition result to the electronic document generating server, and receiving the electronic document generated in accordance with the scanning and recognition result and sent from the electronic document generating server. According to still some other embodiments, a mobile terminal can obtain from another terminal an electronic document generated in accordance with a scanning and recognition result, by sending an electronic document generating request comprising a scanning and recognition result to the other terminal, either via a server or directly, and receiving the electronic document generated in accordance with the scanning and recognition result and sent from the other terminal, either via a server or directly.

According to some embodiments, a mobile terminal can upload an electronic document generated for a target image to a server. According to some embodiments, a mobile terminal can upload an electronic document thus generated to a cloud space in a server, thereby allowing a user to obtain the generated electronic document from the cloud space in the server by logging in a related account from a different terminal than the mobile terminal from which the electronic document has been uploaded.

According to some embodiments, before generating an electronic document in accordance with a scanning and recognition result, a user can edit the scanning and recognition result. According to some embodiments, the editing can comprise: displaying the scanning and recognition result and editing the scanning and recognition result in accordance with edit operations obtained from the user. According to some embodiments, editing a scanning and recognition result can comprise editing text information as a result of OCR of a target image. According to some other embodiments, editing a scanning and recognition result can comprise editing images in non-text areas treated as image areas and retained as a part of a scanning and recognition result. Methods of editing text information and methods of editing images are well-known to those skilled in the art, some of which have been described in detail hereinabove.

Figure 9C:
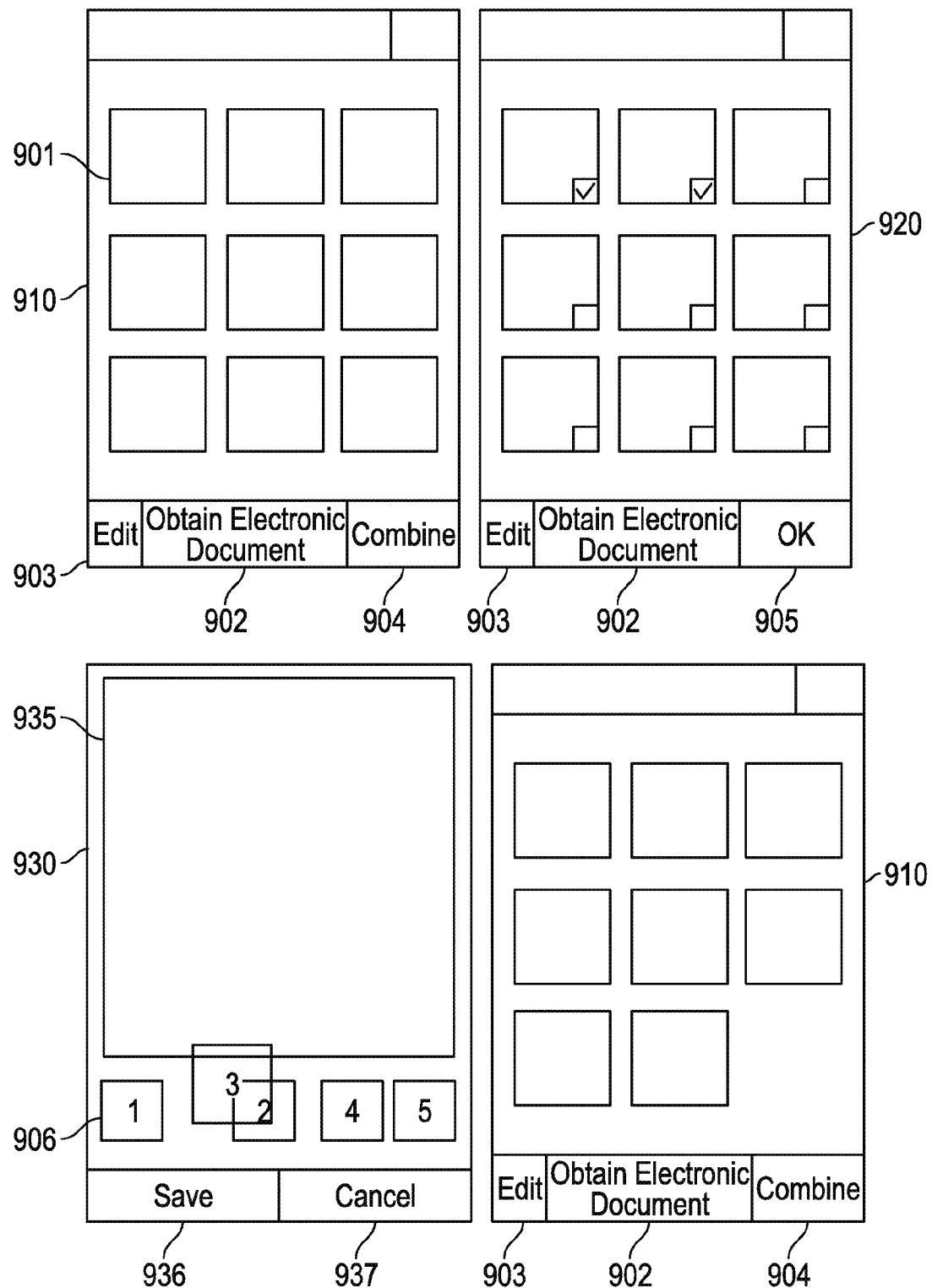
FIG. 9C is an example of user interfaces allowing a user to combine multiple scanning and recognition results in accordance with various embodiments.

According to some embodiments, before generating an electronic document, a user can edit more than one scanning and recognition result. Methods of editing more than one scanning and recognition result are well-known to those skilled in the art, some of which have been described in detail hereinabove. According to some embodiments, an electronic document can be generated from a single scanning and recognition result, either with or without editing. According to some other embodiments, an electronic document can be generated by combining two or more scanning and recognition results. Each scanning and recognition result can either be edited before being combined with other scanning and recognition results, or can be combined without any editing done to itself. FIG. 9C is an example of user interfaces allowing a user to combine multiple scanning and recognition results. A mobile terminal can display a number of scanning and recognition results 901 in a display interface 910, which also displays a number of control buttons, such as generate electronic document button 902, edit button 903, and combine button 904. Once any of these buttons is pressed, a selection interface 920 replaces the display interface 910 and allows a user to select one or more of the scanning and recognition results being displayed. Once at least one of the scanning and recognition results is selected, the button the pressing of which triggered the selection interface 920 turns into a confirmation button 905 (shown in FIG. 9C, the combine button 904 turns into the confirmation button 905). Once the confirmation button 905 is pressed, an operation interface 930 replaces the selection interface 920, allowing the user to perform the operation she chose by pressing one of the control buttons. As illustrated in FIG. 9C, the combine button 904 was pressed and the operation interface 930 is a combine interface, in which the selected scanning and recognition results are arranged next to each other, numbered, and displayed as thumbnails 906. The user can change the order of them by dragging and dropping certain thumbnails, above which in the operation interface 930 is a preview area 935, where a scanning and recognition result can be previewed by pressing a thumbnail corresponding to it. According to some embodiments, a specific scanning and recognition result can be edited by pressing its preview in the operation interface 930. Below the thumbnails 906 in the operation interface 930 are buttons that allow a user to save the combined scanning and recognition result 936 or abort the combination operation 937. Once a scanning and recognition result is saved, the interface can switch back to the display interface 910 where the combined scanning and recognition result is displayed (together with those scanning and recognition results which were not selected for combination, as the case may be), for the user to enter further command to generate electronic document based on the combined scanning and recognition result, to edit the combined scanning and recognition result, or to further combine the combined scanning and recognition result with one or more scanning and recognition results which were not previously selected for combination. As illustrated in FIG. 9C, two of the nine displayed scanning and recognition results were selected for combination, resulting in the display of a combined scanning and recognition result in addition to the seven scanning and recognition results which were not selected for combination.

Figure 7:
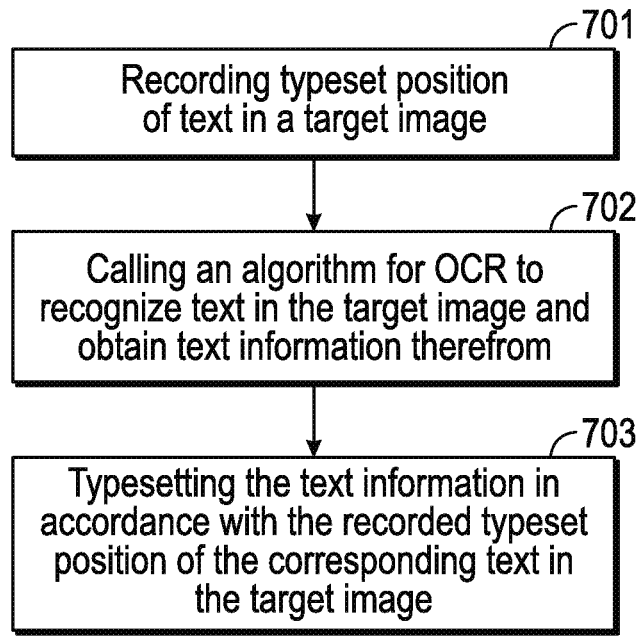
FIG. 7 is a schematic diagram illustrating an example of the flow of a method of scanning and recognizing a target image according to various embodiments.

FIG. 7 is a schematic diagram illustrating an example of the flow of a method of scanning and recognizing a target image according to various embodiments. According to some embodiments, the method can be carried out by a mobile terminal. According to some other embodiments, the method can be carried out by a scanning and recognition server. According to yet some other embodiments, the method can be carried out by a server with scanning and recognition capability. According to still some other embodiments, the method can be carried out by a terminal different from the mobile terminal by which a target image is captured. The method can comprise the following steps.

Step 701: recording typeset position of text in the target image. According to some embodiments, typeset positions of text in a target image can be expressed and/or determined by using a set of typeset coordinates in the target image. According to some embodiments, non-text areas of a target image can be treated as image areas and retained as a part of a scanning and recognition result.

Step 702: calling an algorithm for OCR to recognize text in the target image and obtain text information therefrom.

Step 703: typesetting the text information in accordance with the recorded typeset position of the corresponding text in the target image. According to some embodiments, the text information in a scanning and recognition result after typesetting can occupy relatively the same position in the scanning and recognition result as the corresponding text occupies in the target image.

Figure 8:
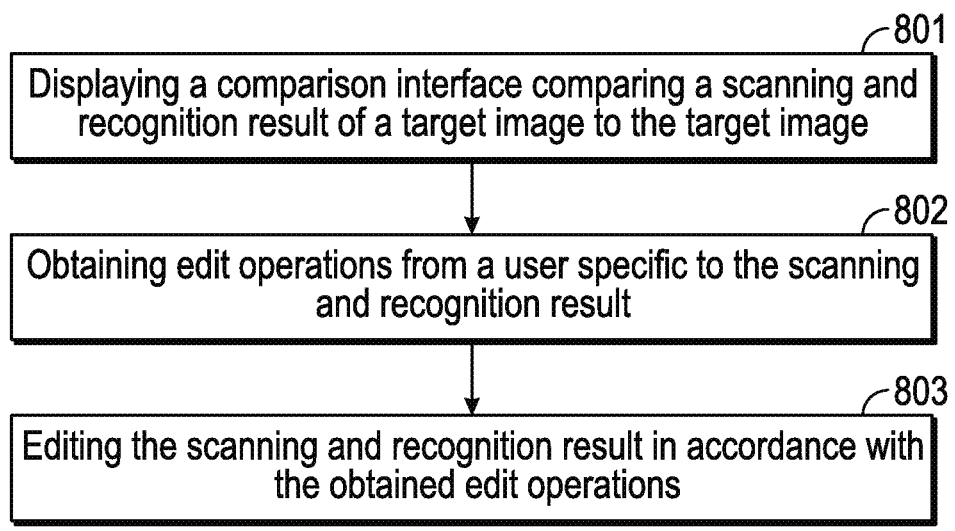
FIG. 8 is a schematic diagram illustrating an example of the flow of a method of editing a scanning and recognition result by a user using a mobile terminal according to various embodiments.

FIG. 8 is a schematic diagram illustrating an example of the flow of a method of editing a scanning and recognition result by a user using a mobile terminal according to various embodiments. The method comprises the following steps.

Step 801: displaying a comparison interface comparing a scanning and recognition result of a target image to the target image. FIG. 9A is a schematic diagram of an example of effect of a comparison interface according to various embodiments, wherein both the scanning and recognition result and the target image are displayed in an editing interface, thereby allowing a user to conveniently edit and proofread the scanning and recognition result.

Step 802: obtaining from a user edit operations specific to the scanning and recognition result. A user can input edit operation commands via keys or a touch screen of a mobile terminal to edit a scanning and recognition result displayed on an editing interface. Methods of inputting such commands are well known to those skilled in the art.

Step 803: editing the scanning and recognition result in accordance with the obtained edit operations.

According to some embodiments, the mobile terminal can have account login function. As used herein, "account login function" refers to the capability of a terminal to determine whether an account has been logged in from it and to act differently based on whether the account has been logged in. The account can be either a local account with respect to the terminal or its operating system, or an online account. There are different reasons for having an account login function. For example, an account can be used to grant or deny access to a terminal, i.e., only after a successful login can a user use a terminal. An account can also be used to grant or deny access to certain functions of a terminal, e.g., a user can use some functions of a terminal but not all the functions without logging in an account and can use all the functions of the terminal only after a successful login. For example, logging in an account may be required for a user to be able to perform one or more of the following functions of a terminal: obtaining a target image, e.g., by using the terminal's integrated digital camera, or by accessing a folder in the terminal in which the target image is stored; scanning and recognition of the target image, either locally or by a server or another terminal, e.g., logging in an account may be required for the terminal to send out a scanning and recognition request to a server or another terminal or to receive a scanning and recognition result from the server or the other terminal; generating an electronic document in accordance with the scanning and recognition result, e.g., logging in an account may be required for the terminal to send out an electronic document generating request to a server or another terminal or to receive an electronic document generated in accordance with a scanning and recognition result from the server or the other terminal; editing a scanning and recognition request, e.g., logging in an account may be required for the terminal to even display a scanning and recognition result, or for the terminal to provide an edit interface where a user can edit a scanning and recognition result. Methods of imposing restrictions to access to one or more functions of a terminal are well known to those skilled in the art.

Figure 10:
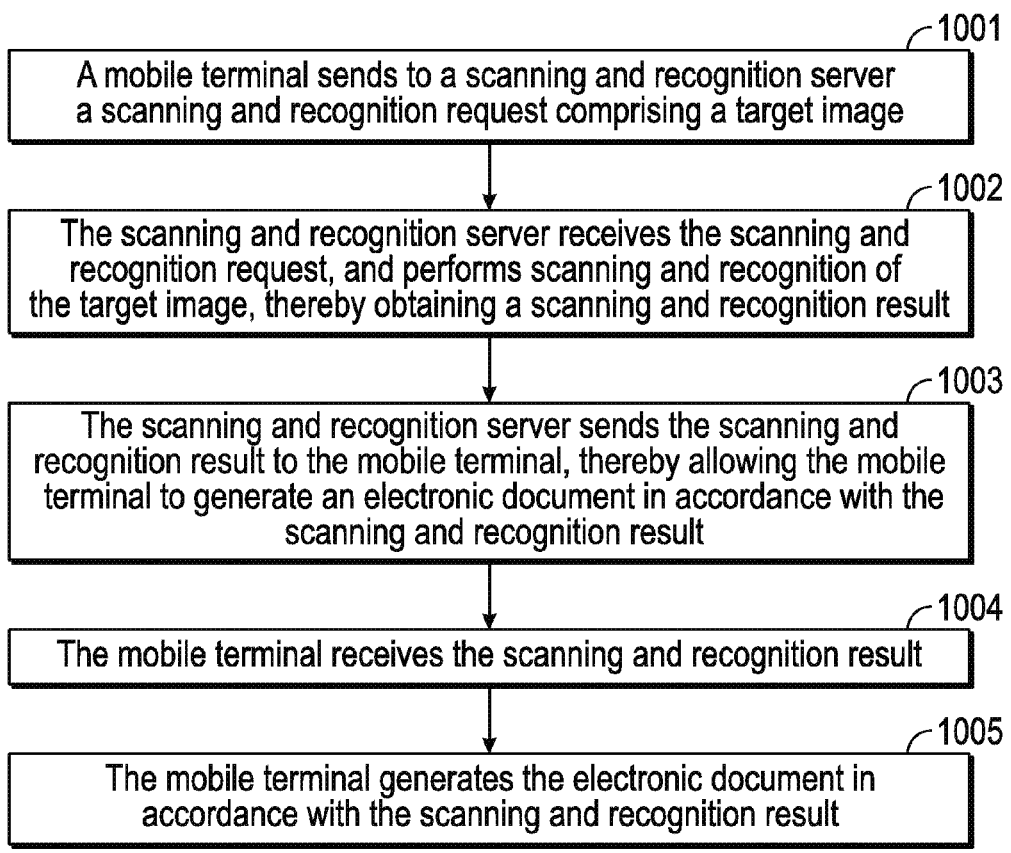
FIG. 10 is a schematic diagram illustrating an example of the flow of a method of generating electronic documents by a mobile terminal according to various embodiments.

FIG. 10 is a schematic diagram illustrating an example of the flow of a method of generating electronic documents by a mobile terminal according to various embodiments. The method can comprise the following steps.

Step 1001: a mobile terminal sends to a scanning and recognition server a scanning and recognition request comprising a target image. According to some embodiments, the target image can be an image that is currently being obtained by the mobile terminal through its picture taking function, e.g., an integrated digital camera. According to some embodiments, the target image can be an image already saved in a picture folder in the mobile terminal. According to these embodiments, therefore, the mobile terminal does not necessarily have to have picture taking function, as long as it supports the storage and recognition of picture files stored either in its memory or externally but transferrable to it via either wired or wireless connection. According to some embodiments, a scanning and recognition request can comprise more than one target image. These target images may all have been obtained by the mobile terminal within a relatively short time frame, e.g., pictures taken in a continuous shooting mode. Alternatively, these target images may have been selected by a user from one or more folders in the mobile terminal.

Step 1002: the scanning and recognition server receives the scanning and recognition request, and performs scanning and recognition of the target image, thereby obtaining a scanning and recognition result. According to some embodiments, scanning and recognition of a target image can comprise scanning the target image and recognizing image and text in the target image. According to some embodiments, the scanning and recognition server can call an algorithm for OCR to recognize text in the target image and obtain text information therefrom. Such algorithms and their associated sample character libraries and character classification categories may be language-specific, but are well known to those skilled in the art in the different languages for which OCR needs to be conducted. FIG. 7 illustrates an example of the flow of a method of scanning and recognizing a target image which can be carried out by a scanning and recognition server.

According to some embodiments, the mobile terminal can obtain the scanning and recognition result from the server only after a verification process. According to some other embodiments, a verification process is available but optional. A verification process provides an opportunity to deny the scanning and recognition request from a mobile terminal if the mobile terminal does not meet one or more criteria. Therefore, the verification process can add an additional layer of security in that even if a user has obtained access to a mobile terminal, she still cannot obtain the scanning and recognition result from the server unless and until the mobile terminal has met the one or more criteria. According to some embodiments, the verification criteria can comprise identification information of the mobile terminal. According to some other embodiments, the verification criteria can comprise the mobile terminal's account login information. As used herein, a terminal's "account login information" means information indicating that an account has been logged in from the terminal. According to some embodiments, the verification process can be carried out by a server. According to some embodiments, the verification process can be carried out by a scanning and recognition server.

According to some embodiments, a scanning and recognition request can comprise identification information of a mobile terminal. According to these embodiments, in the process of obtaining a scanning and recognition result, the server can verify whether the identification information of the mobile terminal entitles the mobile terminal to obtain the scanning and recognition request, and obtain the scanning and recognition result when and only when the verification result is positive.

According to some other embodiments, a scanning and recognition request can comprise the mobile terminal's account login information. In these embodiments, in the process of obtaining a scanning and recognition result, the server can verify whether the account logged in from the mobile terminal has authority to obtain the scanning and recognition result, and obtain the scanning and recognition result when and only when the verification result is positive.

An example verification process by a server based on identification information can be as follows: when the scanning and recognition request comprises identification information of the mobile terminal, the server receives the scanning and recognition request and, in accordance with the scanning and recognition request, verifies whether the identification information matches information stored on the server or is within a whitelist configured for the server. When and only when the result of the verification is positive, the server obtains the scanning and recognition result.

An example verification process by a server based on a terminal's account login information can be as follows: when the scanning and recognition request comprises the mobile terminal's account login information, the server receives the scanning and recognition request and, in accordance with the scanning and recognition request, verifies whether the account logged in from the mobile terminal entitles the mobile terminal to obtain the scanning and recognition result. When and only when the verification result is positive, the server obtains the scanning and recognition result.

The account login information can include single account login information or group account login information. As used herein, "single account" means an account that is not a member of a group account, while "group account" means a collection of member accounts. Usually members of a group account share the same privileges and/or restrictions that are defined for that group. As used herein, a terminal's "single account login information" means information indicating that a single account has been logged in from the terminal, and a terminal's "group account login information" means information indicating that an account belonging to a group account has been logged in from the terminal. There are various methods to set up a group account and these methods are well known to those skilled in the art.

In accordance with the various methods to set up accounts, the server can employ various principles to determine whether an account logged in from a device on a mobile terminal entitles the mobile terminal to obtain a scanning and recognition result. By way of examples only, when the account logged in from the mobile terminal is an account within a specific whitelist configured for the server, the server can determine that the mobile terminal has authority to obtain the scanning and recognition result. These principles and how to apply these principles to achieve account verification are well known to those skilled in the art.

According to some embodiments, the result of a verification process is not a complete denial or allowance of a scanning and recognition request. Instead, part of a scanning and recognition request may be allowed and part denied. This can be achieved by associating the identification information of the mobile terminal or the mobile terminal's login information with different privileges/restrictions or different levels of privileges/restrictions. In these embodiments, the server can serve as a filter rather than a gate. By way of examples only, a particular mobile terminal identification entitles the mobile terminal to send target images of larger sizes than other mobile terminals. In another example, an account logged in from a mobile terminal entitles the mobile terminal to send target images of larger sizes than it would be able to if a different account is logged in from the mobile terminal. As is well known to those skilled in the art, servers typically have size limitations imposed on files sent to it. According to some embodiments, different mobile terminal identifications or different accounts can be associated with different file size limitations imposed on target images sent to the server. When a mobile terminal sends a scanning and recognition request comprising a target image that exceeds the file size limitation imposed on the mobile terminal or an account logged in from it, the server can either deny the scanning and recognition request or request that a smaller-sized target image be sent to the server. If a mobile terminal sends more than one target image at a time and the combined size of all the target images sent to the server exceeds a size limitation associated with the mobile terminal or an account logged in from it, the server can either deny the scanning and recognition request, or proceed with obtaining scanning and recognition results for only some but not all of the target images sent to it. The criteria for such selection are well known to those skilled in the art. For example, a server can receive target images contained in a scanning and recognition request in chronological order until the size limitation has been exceeded, and proceed with obtaining the scanning and recognition results of all the target images already received prior to the one that caused the size limitation to be exceeded. According to some embodiments, different mobile terminal identifications or different accounts can be associated with the presence or absence of, or different levels of, content filtering of a scanning and recognition result. By way of examples only, a server, after obtaining a scanning and recognition result, can apply a content filter to the scanning and recognition result before sending it to the mobile terminal. Application of the content filter can be in accordance with the mobile terminal's identification or the mobile terminal's account login information contained in the scanning and recognition request, and with pre-set mobile terminal identification/content filter or account/content filter association stored in the server. The result of application of a content filter can be either denial of the scanning and recognition request, i.e., no scanning and recognition result is sent to the mobile terminal, or a modified scanning and recognition result in which certain content (e.g., certain recognized text) has been deleted. Content filtering is particularly useful in preventing persons of a certain age group from accessing content inappropriate for that age group, or in protecting copyright work. Methods of associating mobile terminal identifications and/or accounts with different privileges/restrictions or different levels of privileges/restrictions and the principles to apply a filter on the server in accordance therewith are well known to those skilled in the art.

Step 1003: the scanning and recognition server sends the scanning and recognition result to the mobile terminal, thereby allowing the mobile terminal to generate an electronic document in accordance with the scanning and recognition result.

Step 1004: the mobile terminal receives the scanning and recognition result.

Step 1005: the mobile terminal generates the electronic document in accordance with the scanning and recognition result. According to some embodiments, the mobile terminal can generate the electronic document automatically upon receiving the scanning and recognition result. According to some other embodiments, the mobile terminal can prompt the user of the mobile terminal to decide whether to allow the mobile terminal to generate the electronic document and generates the electronic documents only upon a positive command from the user.

According to some embodiments, the mobile terminal allows the user of the mobile terminal to edit the scanning and recognition result before generating the electronic document based thereupon, provided that the mobile terminal can provide the editing functionality. Accordingly, there can be a step of editing the received scanning and recognition result after Step 1004 and before Step 1005. FIG. 8 illustrates an example of the flow of a method of editing a scanning and recognition result by a user on a mobile terminal. According to some embodiments, the mobile terminal can open an edit interface automatically upon receiving the scanning and recognition result. According to some other embodiments, the mobile terminal can prompt the user of the mobile terminal to decide whether to edit the scanning and recognition result and opens the edit interface only upon a positive command from the user.

Figure 11:
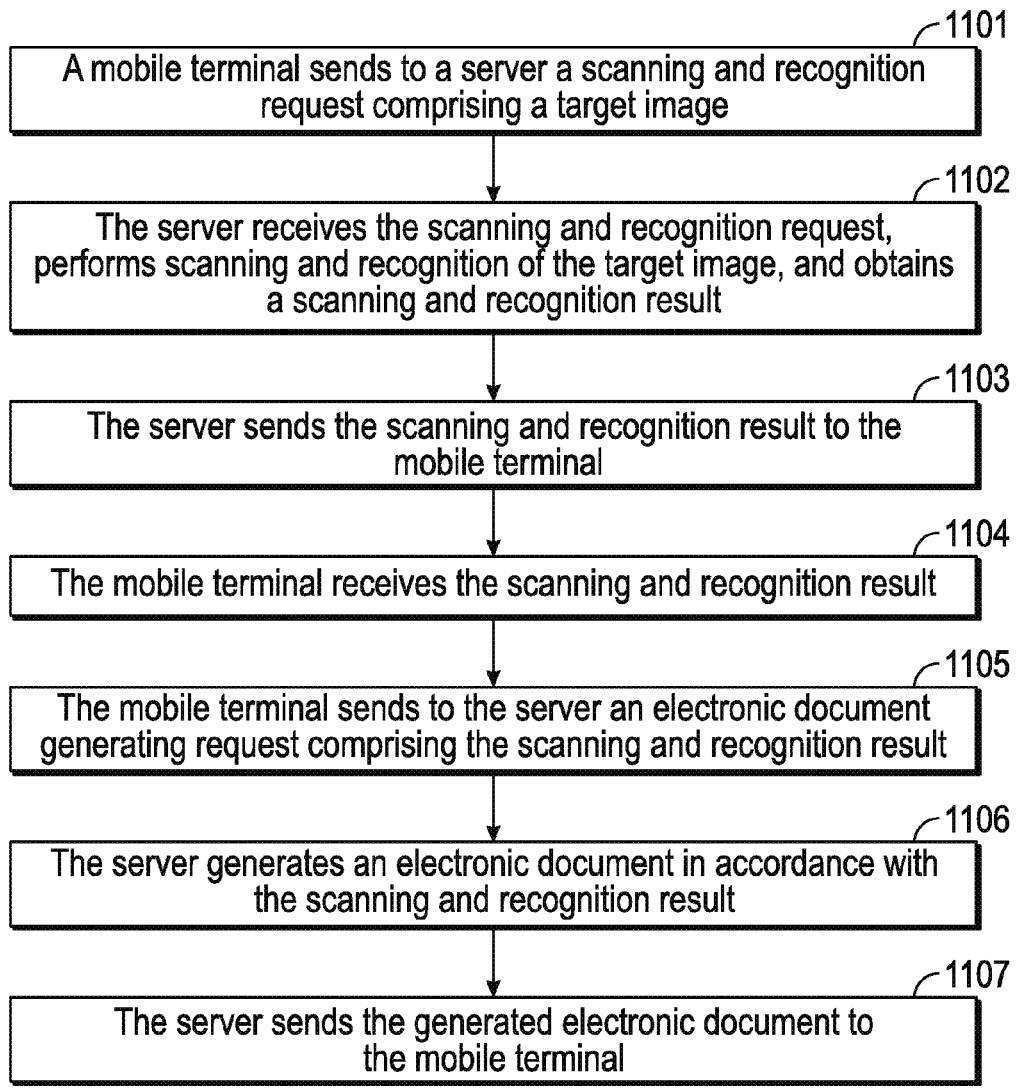
FIG. 11 is a schematic diagram illustrating an example of the flow of a method of generating electronic documents according to various embodiments.

FIG. 11 is a schematic diagram illustrating another example of the flow of a method of generating electronic documents according to various embodiments. The method can comprise the following steps.

Step 1101: a mobile terminal sends to a server a scanning and recognition request comprising a target image.

Step 1102: the server receives the scanning and recognition request, performs scanning and recognition of the target image, and obtains a scanning and recognition result. FIG. 7 illustrates an example of the flow of a method of scanning and recognizing a target image which can be carried out by a server.

According to some embodiments, the mobile terminal can obtain the scanning and recognition result from the server only after a verification process. According to some other embodiments, a verification process is available but optional. Methods of verification and examples of the verification processes have been described in detail hereinabove.

Step 1103: the server sends the scanning and recognition result to the mobile terminal.

Step 1104: the mobile terminal receives the scanning and recognition result. According to some embodiments, the mobile terminal can display the scanning and recognition result upon receiving it. According to some embodiments, the mobile terminal can automatically display the scanning and recognition result upon receiving it. According to some other embodiments, the mobile terminal can prompt the user of the mobile terminal to decide whether to view the scanning and recognition result and display it only upon a positive command from the user.

According to some embodiments, a mobile terminal allows a user to edit the scanning and recognition result upon receiving it. FIG. 8 illustrates an example of the flow of a method of editing a scanning and recognition result by a user on a mobile terminal. According to some embodiments, a mobile terminal can automatically open an edit interface upon receiving the scanning and recognition result. According to some other embodiments, the mobile terminal can prompt the user of the mobile terminal to decide whether to edit the scanning and recognition result and opens the edit interface only upon a positive command from the user.

Step 1105: the mobile terminal sends to the server an electronic document generating request comprising the scanning and recognition result. In those embodiments where the scanning and recognition result has been edited by a user, the mobile terminal can send to the server an electronic document generating request comprising the edited scanning and recognition result.

Step 1106: the server generates an electronic document in accordance with the scanning and recognition result (or the edited scanning and recognition result, as the case may be). According to some embodiments, the server can generate electronic documents in accordance with a scanning and recognition result (or an edited scanning and recognition result, as the case may be) in a pre-set or user customized format. According to some embodiments, a mobile terminal can generate an electronic document in accordance with a scanning and recognition result (or an edited scanning and recognition result, as the case may be) in a pre-set, default format. According to some other embodiments, the server can generate an electronic document in accordance with a scanning and recognition result (or an edited scanning and recognition result, as the case may be) in a format selected by a user. According to these embodiments, the selection of the document format can be included in the electronic document generating request sent from the mobile terminal to the server. According to some other embodiments, selection of the document format can be pre-set in the server by default.

According to some embodiments, the mobile terminal can obtain the electronic document from the server only after a verification process. According to some other embodiments, a verification process is available but optional. A verification process provides an opportunity to deny the electronic document generating request from a mobile terminal if the mobile terminal does not meet one or more criteria. Therefore, the verification process can add an additional layer of security in that even if a user has obtained a scanning and recognition result, she still cannot obtain the electronic document from the server unless and until the mobile terminal has met the one or more criteria. According to some embodiments, the verification criteria can comprise identification information of the mobile terminal. According to some other embodiments, the verification criteria can comprise the mobile terminal's account login information. According to some embodiments, the verification process can be carried out by a server. According to some embodiments, the verification process can be carried out by the same server that has both scanning and recognition capability and electronic document generating capability.

According to some embodiments, an electronic document generating request can comprise identification information of a mobile terminal. According to these embodiments, in the process of obtaining an electronic document, the server can verify whether the identification information of the mobile terminal entitles the mobile terminal to obtain the electronic document, and obtain the electronic document when and only when the verification result is positive.

According to some other embodiments, an electronic document generating request can comprise the mobile terminal's account login information. In these embodiments, in the process of obtaining an electronic document, the server can verify whether the account logged in from the mobile terminal has authority to obtain the electronic document, and obtain the electronic document when and only when the verification result is positive.

An example verification process by a server based on identification information can be as follows: when the electronic document generating request comprises identification information of the mobile terminal, the server receives the electronic document generating request and, in accordance with the electronic document generating request, verifies whether the identification information matches information stored on the server or is within a whitelist configured for the server. When and only when the result of the verification is positive, the server generates the electronic document.

An example verification process by a server based on a terminal's account login information can be as follows: when the electronic document generating request comprises the mobile terminal's account login information, the server receives the electronic document generating request and, in accordance with the electronic document generating request, verifies whether the account logged in from the mobile terminal entitles the mobile terminal to obtain the electronic document. When and only when the verification result is positive, the server generates the electronic document.

The account login information can include single account login information or group account login information. There are various methods to set up a group account and these methods are well known to those skilled in the art.

In accordance with the various methods to set up accounts, the server can employ various principles to determine whether an account logged in from a mobile terminal entitles the mobile terminal to obtain an electronic document. By way of examples only, when the account logged in from the mobile terminal is an account within a specific whitelist configured for the server, the server can determine that the mobile terminal has authority to obtain the electronic document. These principles and how to apply these principles to achieve account verification are well known to those skilled in the art.

According to some embodiments, the result of a verification process is not a complete denial or allowance of an electronic document generating request. Instead, part of an electronic document generating request may be allowed and part denied. This can be achieved by associating the identification information of the mobile terminal or the mobile terminal's login information with different privileges/restrictions or different levels of privileges/restrictions. In these embodiments, the server can serve as a filter rather than a gate. By way of examples only, a particular mobile terminal identification entitles the mobile terminal to obtain electronic documents in certain but not all available formats. In another example, an account logged in from a mobile terminal entitles the mobile terminal to obtain electronic documents of formats different from what the mobile terminal would be able to obtain if a different account is logged in from the mobile terminal. Accordingly, different mobile terminal identifications or different accounts can be associated with different file formats. When a mobile terminal sends an electronic document generating request comprising a file format request different from what is available to the mobile terminal or an account logged in from it, the server can either deny the electronic document generating request or prompt the user to select a different file format which is available to the mobile terminal or the account. According to some embodiments, different mobile terminal identifications or different accounts can be associated with the presence or absence of, or different levels of, content filtering of an electronic document. By way of examples only, a server, after obtaining an electronic document, can apply a content filter to the electronic document before sending it to the mobile terminal. Application of the content filter can be in accordance with the mobile terminal's identification or the mobile terminal's account login information contained in the electronic document generating request, and with pre-set mobile terminal identification/content filter or account/content filter association stored in the server. The result of application of a content filter can be either denial of the scanning and recognition request, i.e., no electronic document is sent to the mobile terminal, or a modified electronic document in which certain content (e.g., certain recognized text) has been deleted. Content filtering is particularly useful in preventing persons of a certain age group from accessing content inappropriate for that age group, or in protecting copyright work. Methods of associating mobile terminal identifications and/or accounts with different privileges/restrictions or different levels of privileges/restrictions and the principles to apply a filter on the server in accordance therewith are well known to those skilled in the art.

Step 1107: the server sends the generated electronic document to the mobile terminal. The mobile terminal can then perform a number of operations with regard to the received electronic document. For example, the mobile terminal can upload the electronic document to a server. According to some embodiments, the mobile terminal can upload the electronic document automatically upon receiving the electronic document. According to some embodiments, the mobile terminal can prompt the user of the mobile terminal to decide whether to upload the electronic document and upload the electronic document only upon a positive command from the user. According to some embodiments, a mobile terminal can upload an electronic document to a cloud space in a server, thereby allowing a user to obtain the generated electronic document from the cloud space in the server by logging in a related account from a different terminal than the mobile terminal from which the electronic document has been uploaded. According to some embodiments, a mobile terminal supports the editing of the electronic document and a user can use the mobile terminal to edit the received electronic document, which then can be uploaded to a server if the mobile terminal supports such uploading. According to some embodiments, a mobile terminal can automatically open an edit interface upon receiving the electronic document. According to some other embodiments, the mobile terminal can prompt the user of the mobile terminal to decide whether to edit the electronic document and opens the edit interface only upon a positive command from the user.

Those skilled in the art will readily appreciate that, the server described immediately above does not have to have received a scanning and recognition request and have sent a scanning and recognition result before receiving an electronic document generating request. That is, steps 1105-1107 can be performed by a server independently of steps 1101-1104. Accordingly, according to some embodiments, a server does not have to have the capability to carry out the actions required of a server in steps 1101-1104, as long as it can carry out the actions required of a server in steps 1105-1107.

Figure 12:
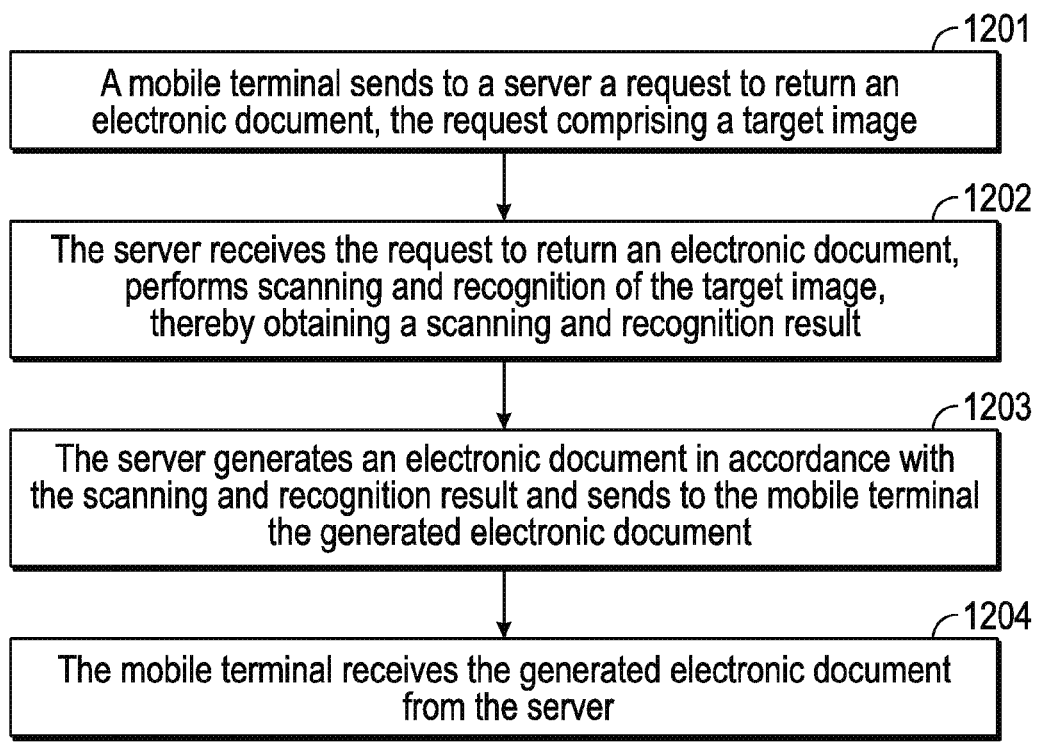
FIG. 12 is a schematic diagram illustrating an example of the flow of a method of generating electronic documents according to various embodiments.

FIG. 12 is a schematic diagram illustrating yet another example of the flow of a method of generating electronic documents according to various embodiments. The method can comprise the following steps.

Step 1201: a mobile terminal sends to a server a request to return an electronic document, the request comprising a target image. According to some embodiments, the target image can be an image that is currently being obtained by the mobile terminal through its picture taking function, e.g., an integrated digital camera. According to some embodiments, the target image can be an image already saved in a picture folder in the mobile terminal. According to these embodiments, therefore, the mobile terminal does not necessarily have to have picture taking function, as long as it supports the storage and recognition of picture files stored either in its memory or externally but transferrable to it via either wired or wireless connection. According to some embodiments, a request to return an electronic document can comprise more than one target image. These target images may all have been obtained by the mobile terminal within a relatively short time frame, e.g., pictures taken in a continuous shooting mode. Alternatively, these target images may have been selected by a user from one or more folders in the mobile terminal.

Step 1202: the server receives the request to return an electronic document, performs scanning and recognition of the target image contained therein, thereby obtaining a scanning and recognition result. FIG. 7 illustrates an example of the flow of a method of scanning and recognizing a target image which can be carried out by the server.

Step 1203: the server generates an electronic document in accordance with the scanning and recognition result and sends to the mobile terminal the generated electronic document. According to some embodiments, the server can generate an electronic document in accordance with a scanning and recognition result in a pre-set, default format. According to some other embodiments, the server can generate an electronic document in accordance with a scanning and recognition result in a format selected by a user. According to these embodiments, the selection of the document format can be included in the request to return an electronic document sent from the mobile terminal to the server. According to some other embodiments, selection of the document format can be pre-set in the server by default.

According to some embodiments, the mobile terminal can obtain the electronic document from the server only after a verification process. According to some other embodiments, a verification process is available but optional. A verification process provides an opportunity to deny a mobile terminal's request to return an electronic document if the mobile terminal does not meet one or more criteria. Therefore, the verification process can add an additional layer of security in that even if a user has obtained access to a mobile terminal, she still cannot obtain the electronic document from the server unless and until the mobile terminal has met the one or more criteria. According to some embodiments, the verification criteria can comprise identification information of the mobile terminal. According to some other embodiments, the verification criteria can comprise the mobile terminal's account login information. According to some embodiments, the verification process can be carried out by a server. According to some embodiments, the verification process can be carried out by the server that obtains the scanning and recognition result and generates the electronic document.

According to some embodiments, a request to return an electronic document can comprise identification information of a mobile terminal. According to these embodiments, in the process of obtaining an electronic document, the server can verify whether the identification information of the mobile terminal entitles the mobile terminal to obtain the electronic document, and sends the electronic document to the mobile terminal when and only when the verification result is positive.

According to some other embodiments, a request to return an electronic document can comprise the mobile terminal's account login information. In these embodiments, in the process of generating an electronic document, the server can verify whether the account logged in from the mobile terminal has authority to obtain the electronic document, and generate the electronic document when and only when the verification result is positive.

An example verification process by a server based on identification information can be as follows: when the request to return an electronic document comprises identification information of the mobile terminal, the server receives the request and, in accordance with the request, verifies whether the identification information matches information stored on the server or is within a whitelist configured for the server. When and only when the result of the verification is positive, the server sends the electronic document to the mobile terminal.

An example verification process by a server based on a terminal's account login information can be as follows: when the request to return an electronic document comprises the mobile terminal's account login information, the server receives the request and, in accordance with the request, verifies whether the account logged in from the mobile terminal entitles the mobile terminal to obtain the electronic document. When and only when the verification result is positive, the server sends the electronic document to the mobile terminal.

The account login information can include single account login information or group account login information. There are various methods to set up a group account and these methods are well known to those skilled in the art.

In accordance with the various methods to set up accounts, the server can employ various principles to determine whether an account logged in from a device on a mobile terminal entitles the mobile terminal to obtain an electronic document. By way of examples only, when the account logged in from the mobile terminal is an account within a specific whitelist configured for the server, the server can determine that the mobile terminal has authority to obtain the scanning and recognition result. These principles and how to apply these principles to achieve account verification are well known to those skilled in the art.

According to some embodiments, the result of a verification process is not a complete denial or allowance of a request to return an electronic document. Instead, part of a scanning and recognition request may be allowed and part denied. This can be achieved by associating the identification information of the mobile terminal or the mobile terminal's login information with different privileges/restrictions or different levels of privileges/restrictions. In these embodiments, the server can serve as a filter rather than a gate. By way of examples only, a particular mobile terminal identification entitles the mobile terminal to send target images of larger sizes than other mobile terminals. In another example, an account logged in from a mobile terminal entitles the mobile terminal to send target images of larger sizes than it would be able to if a different account is logged in the mobile terminal. As is well known to those skilled in the art, servers typically have size limitations imposed on files sent to it. According to some embodiments, different mobile terminal identifications or different accounts can be associated with different file size limitations imposed on target images sent to the server. When a mobile terminal sends a request to return an electronic document and the request comprises a target image that exceeds the file size limitation imposed on the mobile terminal or an account logged in from it, the server can either deny the request to return an electronic document or request that a smaller-sized target image be sent to the server. If a mobile terminal sends more than one target image at a time and the combined size of all the target images sent to the server exceeds a size limitation associated with the mobile terminal or an account logged in from it, the server can either deny the request to return an electronic document, or proceed with obtaining scanning and recognition results for only some but not all of the target images sent to it. The criteria for such selection are well known to those skilled in the art. For example, a server can receive target images contained in a request to return an electronic document in chronological order until the size limitation has been exceeded, and proceed with obtaining the scanning and recognition results of all the target images already received prior to the one that caused the size limitation to be exceeded. By way of examples only, a particular mobile terminal identification can entitle the mobile terminal to obtain electronic documents in certain but not all available formats. In another example, an account logged in from a mobile terminal can entitle the mobile terminal to obtain electronic documents of formats different from what the mobile terminal would be able to obtain if a different account is logged in from the mobile terminal. Accordingly, different mobile terminal identifications or different accounts can be associated with different file formats. When a mobile terminal sends a request to return an electronic document comprising a file format request different from what is available to the mobile terminal or an account logged in from it, the server can either deny the request to return an electronic document or prompt the user to select a different file format which is available to the mobile terminal or the account. According to some embodiments, different mobile terminal identifications or different accounts can be associated with the presence or absence of, or different levels of, content filtering of a scanning and recognition result or of a generated electronic document. By way of examples only, a server, after obtaining a scanning and recognition result, or after generating an electronic document in accordance with the scanning and recognition result, can apply a content filter to the scanning and recognition result or the electronic document. Application of the content filter can be in accordance with the mobile terminal's identification or the mobile terminal's account login information contained in the request to return an electronic document, and with pre-set mobile terminal identification/content filter or account/content filter association stored in the server. The result of application of a content filter can be either denial of the request to return an electronic document, i.e., no electronic document is sent to the mobile terminal, or a modified electronic document from what would have been generated if no filter has been applied, in which certain content (e.g., certain recognized text) has been modified, e.g., deleted. Content filtering is particularly useful in preventing persons of a certain age group from accessing content inappropriate for that age group, or in protecting copyright work. Methods of associating mobile terminal identifications and/or accounts with different privileges/restrictions or different levels of privileges/restrictions and the principles to apply a filter on the server in accordance therewith are well known to those skilled in the art.

Step 1204: the mobile terminal receives the generated electronic document from the server. The mobile terminal can then perform a number of operations with regard to the received electronic document. Such operations are well-known to those skilled in the art, some of which have been described in detail hereinabove.

Figure 13:
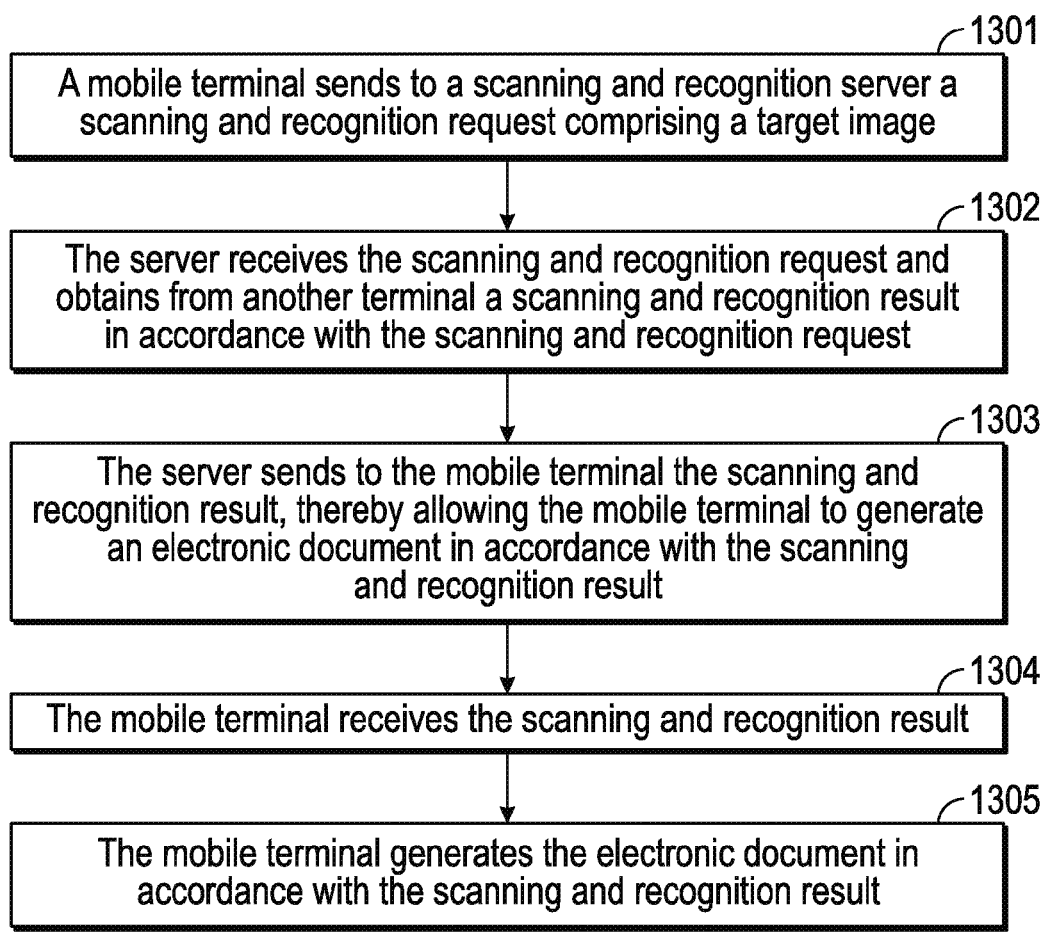
FIG. 13 is a schematic diagram illustrating an example of the flow of a method of generating electronic documents by a mobile terminal according to various embodiments.

FIG. 13 is a schematic diagram illustrating an example of the flow of a method of generating electronic documents by a mobile terminal according to various embodiments. The method can comprise the following steps.

Step 1301: a mobile terminal sends to a scanning and recognition server a scanning and recognition request comprising a target image.

Step 1302: the server receives the scanning and recognition request and obtains from another terminal a scanning and recognition result in accordance with the scanning and recognition request.

According to some embodiments, the mobile terminal can obtain the scanning and recognition result from the other terminal only after a verification process. According to some other embodiments, a verification process is available but optional. A verification process provides an opportunity to deny the scanning and recognition request from a mobile terminal if the mobile terminal does not meet one or more criteria. Therefore, the verification process can add an additional layer of security in that even if a user has obtained access to a mobile terminal, she still cannot obtain the scanning and recognition result from the other terminal unless and until the mobile terminal has met the one or more criteria. According to some embodiments, the verification criteria can comprise identification information of the mobile terminal. According to some other embodiments, the verification criteria can comprise the mobile terminal's account login information. According to some embodiments, the verification process can be carried out by a server.

According to some embodiments, a scanning and recognition request can comprise identification information of a mobile terminal. According to these embodiments, in the process of obtaining from the other terminal a scanning and recognition result, the server can verify whether the identification information of the mobile terminal entitles the mobile terminal to obtain the scanning and recognition request, and request to obtain from the other terminal the scanning and recognition result when and only when the verification result is positive.

According to some other embodiments, a scanning and recognition request can comprise the mobile terminal's account login information. In these embodiments, in the process of obtaining from the other terminal a scanning and recognition result, the server can verify whether the account logged in from the mobile terminal has authority to obtain the scanning and recognition result, and request to obtain from the other terminal the scanning and recognition result when and only when the verification result is positive.

An example verification process by a server based on identification information can be as follows: when the scanning and recognition request comprises identification information of the mobile terminal, the server receives the scanning and recognition request and, in accordance with the scanning and recognition request, verifies whether the identification information matches information stored on the server or is within a whitelist configured for the server. When and only when the result of the verification is positive, the server requests to obtain from the other terminal the scanning and recognition result.

An example verification process by a server based on a terminal's account login information can be as follows: when the scanning and recognition request comprises the mobile terminal's account login information, the server receives the scanning and recognition request and, in accordance with the scanning and recognition request, verifies whether the account logged in from the mobile terminal entitles the mobile terminal to obtain the scanning and recognition result. When and only when the verification result is positive, the server requests to obtain from the other terminal the scanning and recognition result.

The account login information can include single account login information or group account login information. In some example embodiments, if the mobile terminal and the other terminal are two physically separate devices, a user can log in account A on the mobile terminal and can also log in account A on the other terminal. If account A is a single account, then during the verification process, the server will know that the same account has been logged in using both the mobile terminal and the other terminal. In some other example embodiments, a user can log in account a1 one the mobile terminal, and log in account a2 on the other terminal. If accounts a1 and a2 belong to a same group account A, then during the verification process, the server will know that both the first terminal and the second terminal have been used to log in accounts belonging to the same group account A. There are various methods to set up a group account and these methods are well known to those skilled in the art.

In accordance with the various methods to set up accounts, the server can employ various principles to determine whether an account logged in from a device on a mobile terminal entitles the mobile terminal to obtain a scanning and recognition result. By way of examples only, when the account logged in from the mobile terminal is the same as the account logged in from the other terminal, the server can determine that the first terminal has authority to obtain the scanning and recognition result. Or, when the account logged in from the mobile terminal and the account logged in from the other terminal belong to a same group account, the server can determine that the mobile terminal has authority to obtain the scanning and recognition result. Or, when the account logged in from the mobile terminal is an account within a specific whitelist configured for the server, the server can determine that the mobile terminal has authority to obtain the scanning and recognition result. These principles and how to apply these principles to achieve account verification are well known to those skilled in the art.

Of course, the verification process does not have to be configured on any server. Instead, the mobile terminal and the other terminal can complete the verification process through prior negotiation. After the verification is completed, the mobile terminal can then start the process to obtain the scanning and recognition result. Methods of terminal-terminal negotiation and verification are well known to those skilled in the art.

According to some embodiments, the result of a verification process is not a complete denial or allowance of a scanning and recognition request. Instead, part of a scanning and recognition request may be allowed and part denied. This can be achieved by associating the identification information of the mobile terminal or the mobile terminal's login information with different privileges/restrictions or different levels of privileges/restrictions. In these embodiments, the server can serve as a filter rather than a gate. Methods of associating mobile terminal identifications and/or accounts with different privileges/restrictions or different levels of privileges/restrictions and the principles to apply a filter on the server in accordance therewith are well known to those skilled in the art, some of which have been described in detail hereinabove.

Step 1303: the server sends to the mobile terminal the scanning and recognition result, thereby allowing the mobile terminal to generate an electronic document in accordance with the scanning and recognition result.

Step 1304: the mobile terminal receives the scanning and recognition result.

Step 1305: the mobile terminal generates the electronic document in accordance with the scanning and recognition result. According to some embodiments, the mobile terminal can generate the electronic document automatically upon receiving the scanning and recognition result. According to some other embodiments, the mobile terminal can prompt the user of the mobile terminal to decide whether to allow the mobile terminal to generate the electronic document and generates the electronic documents only upon a positive command from the user.

According to some embodiments, the mobile terminal allows the user of the mobile terminal to edit the scanning and recognition result before generating the electronic document based thereupon, provided that the mobile terminal can provide the editing functionality. Accordingly, there can be a step of editing the received scanning and recognition result after Step 1304 and before Step 1305. FIG. 8 illustrates an example of the flow of a method of editing a scanning and recognition result by a user on a mobile terminal. According to some embodiments, the mobile terminal can open an edit interface automatically upon receiving the scanning and recognition result. According to some other embodiments, the mobile terminal can prompt the user of the mobile terminal to decide whether to edit the scanning and recognition result and opens the edit interface only upon a positive command from the user.

Figure 14:
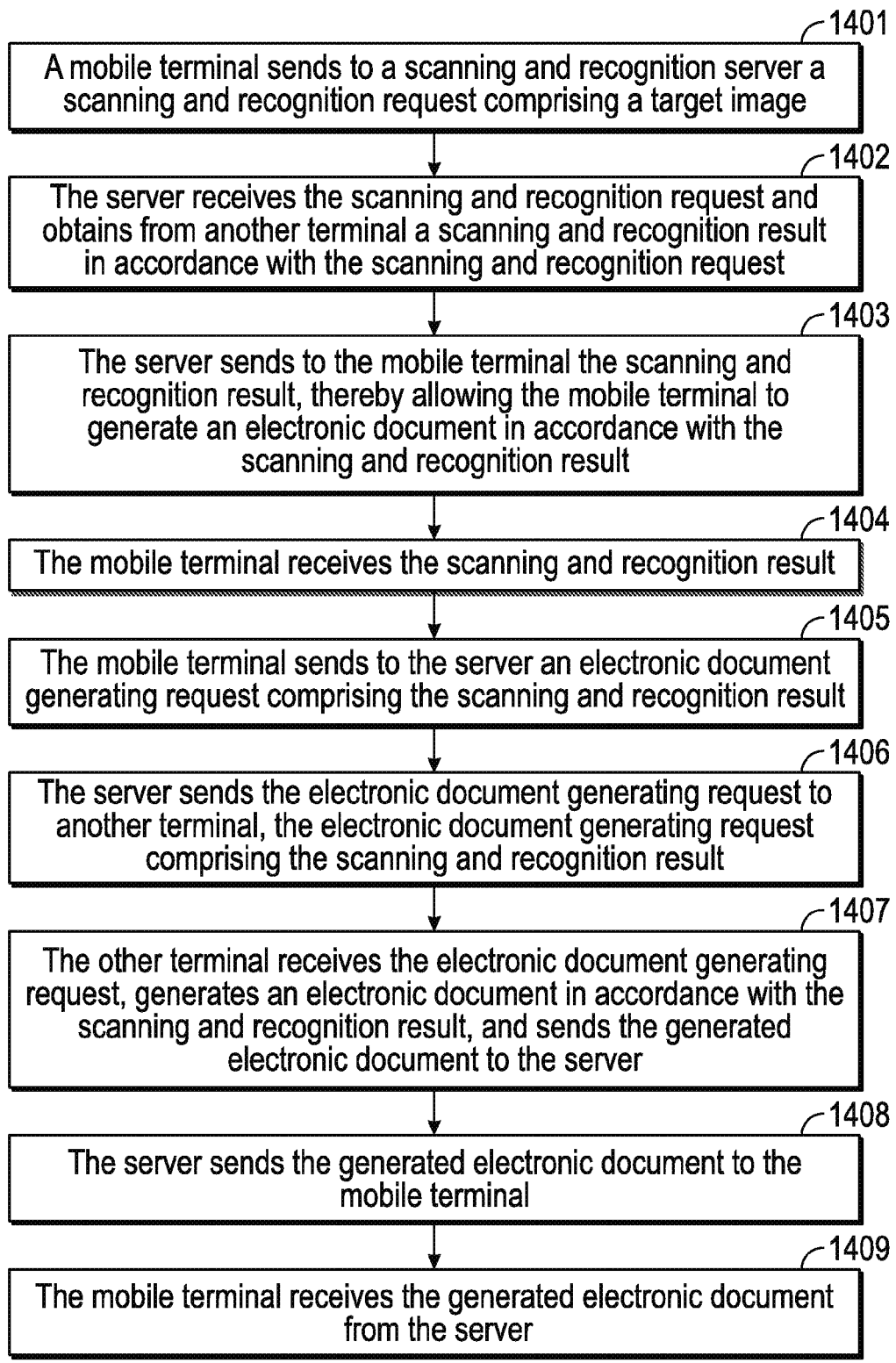
FIG. 14 is a schematic diagram illustrating an example of the flow of a method of generating electronic documents according to various embodiments.

According to some embodiments, instead of, or as an option to, generating the electronic document by the mobile terminal itself, the mobile terminal can request and obtain the electronic document from another terminal via a server. According to some embodiments, the other terminal can be the same terminal from which the scanning and recognition result is obtained. According to some other embodiments, the other terminal can be different from the terminal from which the scanning and recognition result is obtained. According to some embodiments, the server can be the same server to which the scanning and recognition request has been sent. According to some other embodiments, the server can be different from the server to which the scanning and recognition request has been sent. FIG. 14 is a schematic diagram illustrating an example of the flow of a method of generating electronic documents according to various embodiments, wherein the other terminal is the same terminal from which the scanning and recognition result is obtained and the server is the same server to which the scanning and recognition request has been sent. The method can comprise the following steps.

Steps 1401-1404 are the same as steps 1301-1304, respectively.

Step 1405: the mobile terminal sends to the server an electronic document generating request comprising the scanning and recognition result.

According to some embodiments, the mobile terminal allows the user of the mobile terminal to edit the scanning and recognition result before generating the electronic document based thereupon, provided that the mobile terminal can provide the editing functionality. Accordingly, there can be a step of editing the received scanning and recognition result after Step 1404 and before Step 1405. FIG. 8 illustrates an example of the flow of a method of editing a scanning and recognition result by a user on a mobile terminal. According to some embodiments, the mobile terminal can open an edit interface automatically upon receiving the scanning and recognition result. According to some other embodiments, the mobile terminal can prompt the user of the mobile terminal to decide whether to edit the scanning and recognition result and opens the edit interface only upon a positive command from the user.

Step 1406: the server sends the electronic document generating request to the other terminal, the electronic document generating request comprising the scanning and recognition result (or the edited scanning and recognition result, as the case may be).

Step 1407: the other terminal receives the electronic document generating request, generates an electronic document in accordance with the scanning and recognition result (or the edited scanning and recognition result, as the case may be), and sends the generated electronic document to the server.

According to some embodiments, the other terminal can generate an electronic document in accordance with a scanning and recognition result (or an edited scanning and recognition result, as the case may be) in a pre-set, default format. According to some other embodiments, the other terminal can generate an electronic document in accordance with a scanning and recognition result (or an edited scanning and recognition result, as the case may be) in a format selected by a user. According to these embodiments, the selection of the document format can be included in the electronic document generating request sent from the mobile terminal to the server. According to some other embodiments, selection of the document format can be pre-set in the other terminal by default.

According to some embodiments, the mobile terminal can obtain the electronic document from the server only after a verification process. According to some other embodiments, a verification process is available but optional. A verification process provides an opportunity to deny the electronic document generating request from a mobile terminal if the mobile terminal does not meet one or more criteria. Therefore, the verification process can add an additional layer of security in that even if a user has obtained a scanning and recognition result, she still cannot obtain the electronic document from the other terminal unless and until the mobile terminal has met the one or more criteria. According to some embodiments, the verification criteria can comprise identification information of the mobile terminal. According to some other embodiments, the verification criteria can comprise the mobile terminal's account login information. According to some embodiments, the verification process can be carried out by a server. According to some embodiments, the verification process can be carried out by the same server that has been described in the process being described.

According to some embodiments, an electronic document generating request can comprise identification information of a mobile terminal. According to these embodiments, in the process of obtaining an electronic document, the server can verify whether the identification information of the mobile terminal entitles the mobile terminal to obtain the electronic document, and obtain the electronic document when and only when the verification result is positive.

According to some other embodiments, an electronic document generating request can comprise the mobile terminal's account login information. In these embodiments, in the process of obtaining an electronic document, the server can verify whether the account logged in from the mobile terminal has authority to obtain the electronic document, and obtain the electronic document when and only when the verification result is positive.

An example verification process by a server based on identification information can be as follows: when the electronic document generating request comprises identification information of the mobile terminal, the server receives the electronic document generating request and, in accordance with the electronic document generating request, verifies whether the identification information matches information stored on the server or is within a whitelist configured for the server. When and only when the result of the verification is positive, the server obtains the electronic document from the other terminal.

An example verification process by a server based on a terminal's account login information can be as follows: when the electronic document generating request comprises the mobile terminal's account login information, the server receives the electronic document generating request and, in accordance with the electronic document generating request, verifies whether the account logged in from the mobile terminal entitles the mobile terminal to obtain the electronic document. When and only when the verification result is positive, the server obtains the electronic document from the other terminal.

The account login information can include single account login information or group account login information. In some example embodiments, if the mobile terminal and the other terminal are two physically separate devices, a user can log in account A on the mobile terminal and can also log in account A on the other terminal. If account A is a single account, then during the verification process, the server will know that the same account has been logged in using both the mobile terminal and the other terminal. In some other example embodiments, a user can log in account a1 one the mobile terminal, and log in account a2 on the other terminal. If accounts a1 and a2 belong to a same group account A, then during the verification process, the server will know that both the first terminal and the second terminal have been used to log in accounts belonging to the same group account A. There are various methods to set up a group account and these methods are well known to those skilled in the art.

In accordance with the various methods to set up accounts, the server can employ various principles to determine whether an account logged in from a device on a mobile terminal entitles the mobile terminal to obtain an electronic document. By way of examples only, when the account logged in from the mobile terminal is the same as the account logged in from the other terminal, the server can determine that the first terminal has authority to obtain the electronic document. Or, when the account logged in from the mobile terminal and the account logged in from the other terminal belong to a same group account, the server can determine that the mobile terminal has authority to obtain the electronic document. Or, when the account logged in from the mobile terminal is an account within a specific whitelist configured for the server, the server can determine that the mobile terminal has authority to obtain the scanning and recognition result. These principles and how to apply these principles to achieve account verification are well known to those skilled in the art.

According to some embodiments, the result of a verification process is not a complete denial or allowance of an electronic document generating request. Instead, part of an electronic document generating request may be allowed and part denied. This can be achieved by associating the identification information of the mobile terminal or the mobile terminal's login information with different privileges/restrictions or different levels of privileges/restrictions. In these embodiments, the server can serve as a filter rather than a gate. By way of examples only, a particular mobile terminal identification entitles the mobile terminal to obtain electronic documents in certain but not all available formats. In another example, an account logged in from a mobile terminal entitles the mobile terminal to obtain electronic documents of formats different from what the mobile terminal would be able to obtain if a different account is logged in from the mobile terminal. Accordingly, different mobile terminal identifications or different accounts can be associated with different file formats. When a mobile terminal sends an electronic document generating request comprising a file format request different from what is available to the mobile terminal or an account logged in from it, the server can either deny the electronic document generating request or prompt the user to select a different file format which is available to the mobile terminal or the account. According to some embodiments, different mobile terminal identifications or different accounts can be associated with the presence or absence of, or different levels of, content filtering of an electronic document. By way of examples only, a server, after obtaining an electronic document, can apply a content filter to the electronic document before sending it to the mobile terminal. Application of the content filter can be in accordance with the mobile terminal's identification or the mobile terminal's account login information contained in the electronic document generating request, and with pre-set mobile terminal identification/content filter or account/content filter association stored in the server. The result of application of a content filter can be either denial of the scanning and recognition request, i.e., no electronic document is sent to the mobile terminal, or a modified electronic document in which certain content (e.g., certain recognized text) has been deleted. Content filtering is particularly useful in preventing persons of a certain age group from accessing content inappropriate for that age group, or in protecting copyright work. Methods of associating mobile terminal identifications and/or accounts with different privileges/restrictions or different levels of privileges/restrictions and the principles to apply a filter on the server in accordance therewith are well known to those skilled in the art.

Step 1408: the server sends the generated electronic document to the mobile terminal.

Step 1409: the mobile terminal receives the generated electronic document from the server. The mobile terminal can then perform a number of operations with regard to the received electronic document. Such operations are well-known to those skilled in the art, some of which have been described in detail hereinabove.

Those skilled in the art will readily appreciate that, the server described immediately above does not have to have received a scanning and recognition request and have sent a scanning and recognition result before receiving an electronic document generating request. That is, steps 1405-1408 can be performed by a server independently of steps 1401-1404. Accordingly, according to some embodiments, a server does not have to have the capability to carry out the actions required of a server in steps 1401-1404, as long as it can carry out the actions required of a server in steps 1405-1108.

Figure 15:
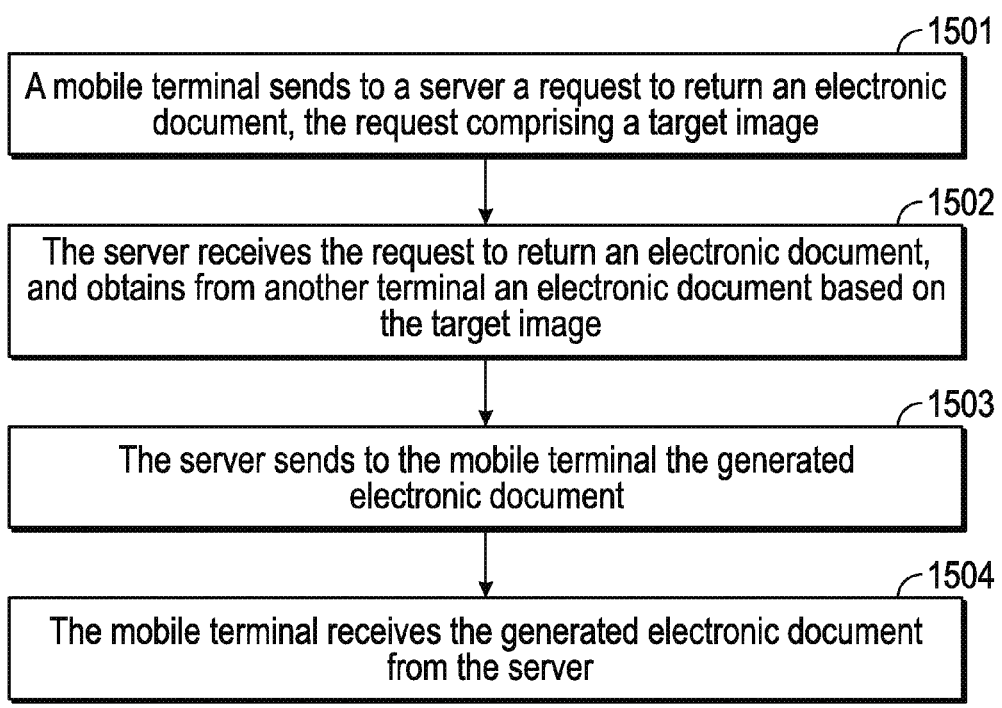
FIG. 15 is a schematic diagram illustrating an example of the flow of a method of generating electronic documents according to various embodiments.

FIG. 15 is a schematic diagram illustrating yet another example of the flow of a method of generating electronic documents according to various embodiments. The method can comprise the following steps.

Step 1501: a mobile terminal sends to a server a request to return an electronic document, the request comprising a target image.

Step 1502: the server receives the request to return an electronic document, and obtains from another terminal an electronic document based on the target image, wherein the other terminal performs scanning and recognition of the target image contained in the request to return an electronic document, and generates an electronic document in accordance with a result of the scanning and recognition.

Step 1503: the server sends to the mobile terminal the generated electronic document.

According to some embodiments, the mobile terminal can obtain the electronic document from the other terminal only after a verification process. According to some other embodiments, a verification process is available but optional. A verification process provides an opportunity to deny a mobile terminal's request to return an electronic document if the mobile terminal does not meet one or more criteria. Therefore, the verification process can add an additional layer of security in that even if a user has obtained access to a mobile terminal, she still cannot obtain the electronic document from the other terminal unless and until the mobile terminal has met the one or more criteria. According to some embodiments, the verification criteria can comprise identification information of the mobile terminal. According to some other embodiments, the verification criteria can comprise the mobile terminal's account login information. According to some embodiments, the verification process can be carried out by a server. According to some embodiments, the verification process can be carried out by the server that receives the request to return an electronic document.

According to some embodiments, a request to return an electronic document can comprise identification information of a mobile terminal. According to these embodiments, in the process of obtaining an electronic document, the server can verify whether the identification information of the mobile terminal entitles the mobile terminal to obtain the electronic document, and sends the electronic document to the mobile terminal when and only when the verification result is positive.

According to some other embodiments, a request to return an electronic document can comprise the mobile terminal's account login information. In these embodiments, in the process of generating an electronic document, the server can verify whether the account logged in from the mobile terminal has authority to obtain the electronic document, and generate the electronic document when and only when the verification result is positive.

An example verification process by a server based on identification information can be as follows: when the request to return an electronic document comprises identification information of the mobile terminal, the server receives the request and, in accordance with the request, verifies whether the identification information matches information stored on the server or is within a whitelist configured for the server. When and only when the result of the verification is positive, the server sends the electronic document to the mobile terminal.

An example verification process by a server based on a terminal's account login information can be as follows: when the request to return an electronic document comprises the mobile terminal's account login information, the server receives the request and, in accordance with the request, verifies whether the account logged in from the mobile terminal entitles the mobile terminal to obtain the electronic document. When and only when the verification result is positive, the server sends the electronic document to the mobile terminal.

The account login information can include single account login information or group account login information. In some example embodiments, if the mobile terminal and the other terminal are two physically separate devices, a user can log in account A on the mobile terminal and can also log in account A on the other terminal. If account A is a single account, then during the verification process, the server will know that the same account has been logged in using both the mobile terminal and the other terminal. In some other example embodiments, a user can log in account a1 one the mobile terminal, and log in account a2 on the other terminal. If accounts a1 and a2 belong to a same group account A, then during the verification process, the server will know that both the first terminal and the second terminal have been used to log in accounts belonging to the same group account A. There are various methods to set up a group account and these methods are well known to those skilled in the art.

In accordance with the various methods to set up accounts, the server can employ various principles to determine whether an account logged in from a device on a mobile terminal entitles the mobile terminal to obtain an electronic document. By way of examples only, when the account logged in from the mobile terminal is the same as the account logged in from the other terminal, the server can determine that the first terminal has authority to obtain the electronic document. Or, when the account logged in from the mobile terminal and the account logged in from the other terminal belong to a same group account, the server can determine that the mobile terminal has authority to obtain the electronic document. Or, when the account logged in from the mobile terminal is an account within a specific whitelist configured for the server, the server can determine that the mobile terminal has authority to obtain the scanning and recognition result. These principles and how to apply these principles to achieve account verification are well known to those skilled in the art.

According to some embodiments, the result of a verification process is not a complete denial or allowance of a request to return an electronic document. Instead, part of a scanning and recognition request may be allowed and part denied. This can be achieved by associating the identification information of the mobile terminal or the mobile terminal's login information with different privileges/restrictions or different levels of privileges/restrictions. In these embodiments, the server can serve as a filter rather than a gate. Methods of associating mobile terminal identifications and/or accounts with different privileges/restrictions or different levels of privileges/restrictions and the principles to apply a filter on the server in accordance therewith are well known to those skilled in the art, some of which have been described in detail hereinabove.

Step 1504: the mobile terminal receives the generated electronic document from the server. The mobile terminal can then perform a number of operations with regard to the received electronic document. Such operations are well known to those skilled in the art, some of which have been described in detail hereinabove.

The above examples of processes and devices are described in terms of a mobile terminal, through a server, obtains a scanning and recognition result and/or an electronic document from another terminal. According to some other embodiments, a mobile terminal can obtain a scanning and recognition result and/or an electronic document from another terminal in the absence of a server. This can be achieved, e.g., when the mobile terminal and the other terminal are directly connected to each other. Such terminal-terminal connection methods are well known to those skilled in the art, e.g., both terminals can be in a local area network, e.g., a WiFi network, or are directly connected to each other via such connections as Bluetooth, infrared, or near field communication.

Figure 16:
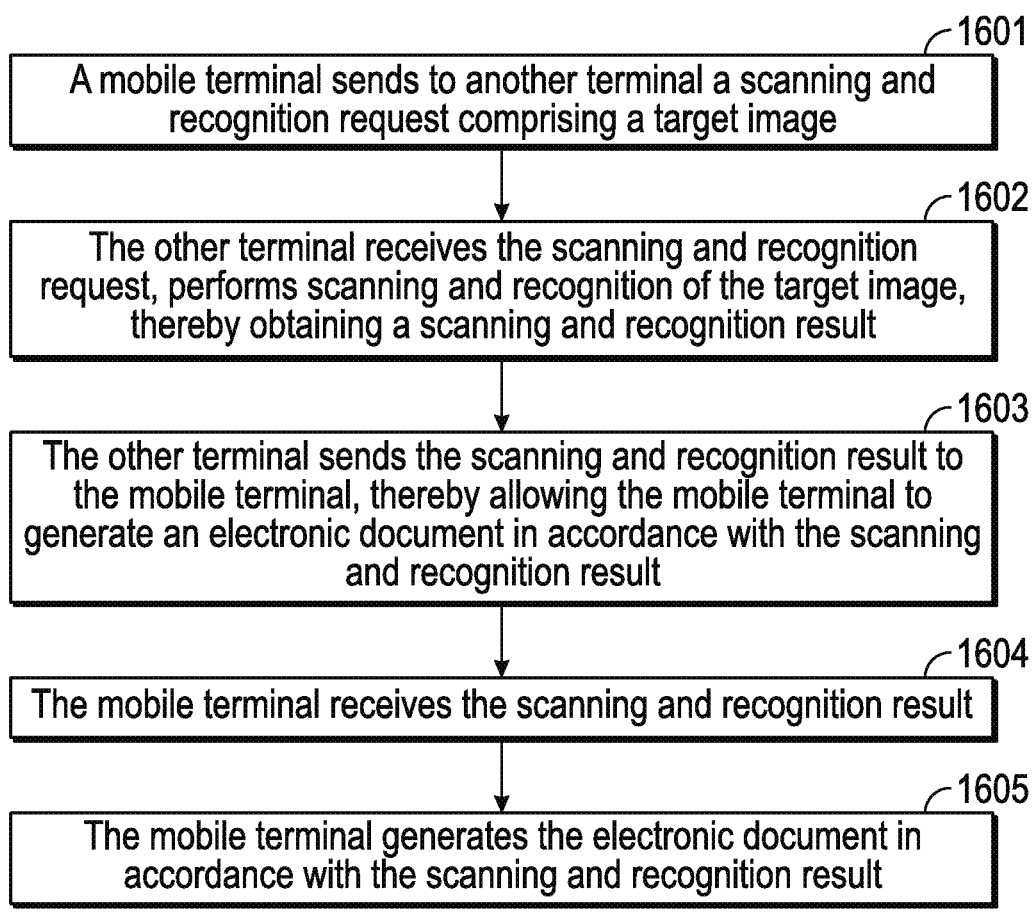
FIG. 16 is a schematic diagram illustrating an example of the flow of a method of generating electronic documents by a mobile terminal according to various embodiments.

FIG. 16 is a schematic diagram illustrating an example of the flow of a method of generating electronic documents by a mobile terminal according to various embodiments. The method can comprise the following steps.

Step 1601: a mobile terminal sends to another terminal a scanning and recognition request comprising a target image.

Step 1602: the other terminal receives the scanning and recognition request, performs scanning and recognition of the target image, thereby obtaining a scanning and recognition result. FIG. 7 illustrates an example of the flow of a method of scanning and recognizing a target image which can be carried out by the other terminal.

According to some embodiments, the mobile terminal can obtain the scanning and recognition result from the other terminal only after a verification process. According to some other embodiments, a verification process is available but optional. A verification process provides an opportunity to deny the scanning and recognition request from a mobile terminal if the mobile terminal does not meet one or more criteria. Therefore, the verification process can add an additional layer of security in that even if a user has obtained access to a mobile terminal, she still cannot obtain the scanning and recognition result from the other terminal unless and until the mobile terminal has met the one or more criteria. According to some embodiments, the verification criteria can comprise identification information of the mobile terminal. According to some other embodiments, the verification criteria can comprise the mobile terminal's account login information. According to some embodiments, the verification process can be carried out by a server. According to some embodiments, the verification process can be carried out by the other terminal.

According to some embodiments, a scanning and recognition request can comprise identification information of a mobile terminal. According to these embodiments, in the process of obtaining a scanning and recognition result, the other terminal can verify whether the identification information of the mobile terminal entitles the mobile terminal to obtain the scanning and recognition request, and obtain the scanning and recognition result when and only when the verification result is positive.

According to some other embodiments, a scanning and recognition request can comprise the mobile terminal's account login information. In these embodiments, in the process of obtaining a scanning and recognition result, the other terminal can verify whether the account logged in from the mobile terminal has authority to obtain the scanning and recognition result, and obtain the scanning and recognition result when and only when the verification result is positive.

An example verification process by the other terminal based on identification information can be as follows: when the scanning and recognition request comprises identification information of the mobile terminal, the other terminal receives the scanning and recognition request and, in accordance with the scanning and recognition request, verifies whether the identification information matches information stored on the other terminal or is within a whitelist configured for the other terminal. When and only when the result of the verification is positive, the other terminal obtains the scanning and recognition result.

An example verification process by the other terminal based on a terminal's account login information can be as follows: when the scanning and recognition request comprises the mobile terminal's account login information, the other terminal receives the scanning and recognition request and, in accordance with the scanning and recognition request, verifies whether the account logged in from the mobile terminal entitles the mobile terminal to obtain the scanning and recognition result. When and only when the verification result is positive, the other terminal obtains the scanning and recognition result.

An example verification process by the other based on a terminal's account login information can be as follows: when the scanning and recognition request comprises the mobile terminal's account login information, the other terminal receives the scanning and recognition request and, in accordance with the scanning and recognition request, verifies whether the account logged in from the mobile terminal entitles the mobile terminal to obtain the scanning and recognition result. When and only when the verification result is positive, the other terminal obtains the scanning and recognition result.

The account login information can include single account login information or group account login information. In some example embodiments, if the mobile terminal and the other terminal are two physically separate devices, a user can log in account A on the mobile terminal and can also log in account A on the other terminal. If account A is a single account, then during the verification process, the other terminal will know that the same account has been logged in using both the mobile terminal and the other terminal. In some other example embodiments, a user can log in account a1 one the mobile terminal, and log in account a2 on the other terminal. If accounts a1 and a2 belong to a same group account A, then during the verification process, the other terminal will know that both the first terminal and the second terminal have been used to log in accounts belonging to the same group account A. There are various methods to set up a group account and these methods are well known to those skilled in the art.

In accordance with the various methods to set up accounts, the other terminal can employ various principles to determine whether an account logged in from a mobile terminal entitles the mobile terminal to obtain a scanning and recognition result. By way of examples only, when the account logged in from the mobile terminal is the same as the account logged in from the other terminal, the other terminal can determine that the mobile terminal has authority to obtain the scanning and recognition result. Or, when the account logged in from the mobile terminal and the account logged in from the other terminal belong to a same group account, the other terminal can determine that the mobile terminal has authority to obtain the scanning and recognition result. Or, when the account logged in from the mobile terminal is an account within a specific whitelist configured for the other terminal, the other terminal can determine that the mobile terminal has authority to obtain the scanning and recognition result. These principles and how to apply these principles to achieve account verification are well known to those skilled in the art.

According to some embodiments, the result of a verification process is not a complete denial or allowance of a scanning and recognition request. Instead, part of a scanning and recognition request may be allowed and part denied. This can be achieved by associating the identification information of the mobile terminal or the mobile terminal's login information with different privileges/restrictions or different levels of privileges/restrictions. In these embodiments, the other terminal can serve as a filter rather than a gate. By way of examples only, a particular mobile terminal identification entitles the mobile terminal to send target images of larger sizes than other mobile terminals. In another example, an account logged in from a mobile terminal entitles the mobile terminal to send target images of larger sizes than it would be able to if a different account is logged in the mobile terminal. According to some embodiments, different mobile terminal identifications or different accounts can be associated with different file size limitations imposed on target images sent to the other terminal. When a mobile terminal sends a scanning and recognition request comprising a target image that exceeds the file size limitation imposed on the mobile terminal or an account logged in from it, the other terminal can either deny the scanning and recognition request or request that a smaller-sized target image be sent to the other terminal. If a mobile terminal sends more than one target image at a time and the combined size of all the target images sent to the other terminal exceeds a size limitation associated with the mobile terminal or an account logged in from it, the other terminal can either deny the scanning and recognition request, or proceed with obtaining scanning and recognition results for only some but not all of the target images sent to it. The criteria for such selection are well known to those skilled in the art. For example, the other terminal can receive target images contained in a scanning and recognition request in chronological order until the size limitation has been exceeded, and proceed with obtaining the scanning and recognition results of all the target images already received prior to the one that caused the size limitation to be exceeded. According to some embodiments, different mobile terminal identifications or different accounts can be associated with the presence or absence of, or different levels of, content filtering of a scanning and recognition result. By way of examples only, the other terminal, after obtaining a scanning and recognition result, can apply a content filter to the scanning and recognition result before sending it to the mobile terminal. Application of the content filter can be in accordance with the mobile terminal's identification or the mobile terminal's account login information contained in the scanning and recognition request, and with pre-set mobile terminal identification/content filter or account/content filter association stored in the other terminal. The result of application of a content filter can be either denial of the scanning and recognition request, i.e., no scanning and recognition result is sent to the mobile terminal, or a modified scanning and recognition result in which certain content (e.g., certain recognized text) has been deleted. Content filtering is particularly useful in preventing persons of a certain age group from accessing content inappropriate for that age group, or in protecting copyright work. Methods of associating mobile terminal identifications and/or accounts with different privileges/restrictions or different levels of privileges/restrictions and the principles to apply a filter on the other terminal in accordance therewith are well known to those skilled in the art.

Step 1603: the other terminal sends the scanning and recognition result to the mobile terminal, thereby allowing the mobile terminal to generate an electronic document in accordance with the scanning and recognition result.

Step 1604: the mobile terminal receives the scanning and recognition result.

Step 1605: the mobile terminal generates the electronic document in accordance with the scanning and recognition result. According to some embodiments, the mobile terminal can generate the electronic document automatically upon receiving the scanning and recognition result. According to some other embodiments, the mobile terminal can prompt the user of the mobile terminal to decide whether to allow the mobile terminal to generate the electronic document and generates the electronic documents only upon a positive command from the user.

According to some embodiments, the mobile terminal allows the user of the mobile terminal to edit the scanning and recognition result before generating the electronic document based thereupon, provided that the mobile terminal can provide the editing functionality. Accordingly, there can be a step of editing the received scanning and recognition result after Step 1604 and before Step 1605. FIG. 8 illustrates an example of the flow of a method of editing a scanning and recognition result by a user on a mobile terminal. According to some embodiments, the mobile terminal can open an edit interface automatically upon receiving the scanning and recognition result. According to some other embodiments, the mobile terminal can prompt the user of the mobile terminal to decide whether to edit the scanning and recognition result and opens the edit interface only upon a positive command from the user.

Figure 17:
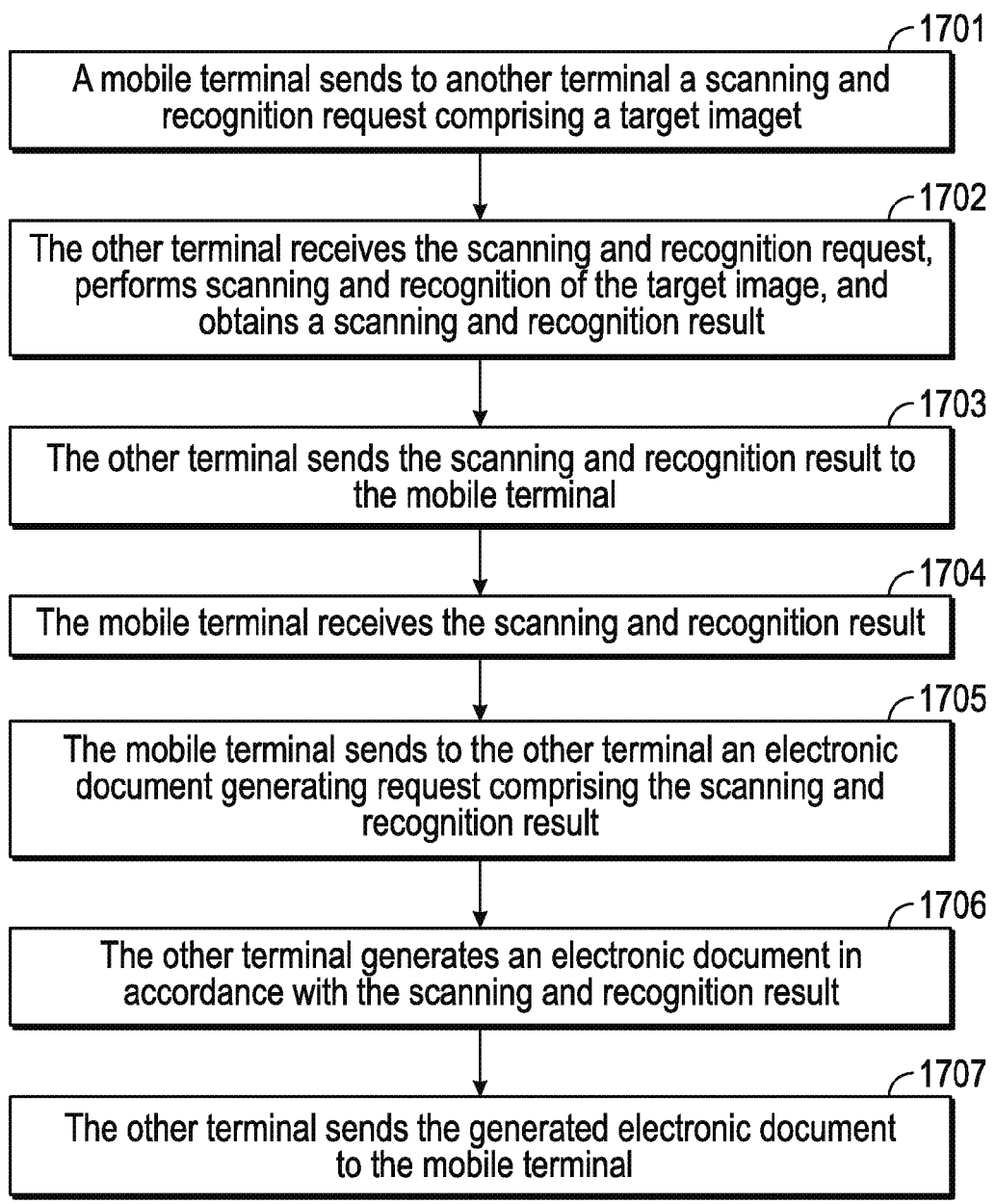
FIG. 17 is a schematic diagram illustrating an example of the flow of a method of generating electronic documents according to various embodiments.

FIG. 17 is a schematic diagram illustrating another example of the flow of a method of generating electronic documents according to various embodiments. The method can comprise the following steps.

Step 1701: a mobile terminal sends to another terminal a scanning and recognition request comprising a target image.

Step 1702: the other terminal receives the scanning and recognition request, performs scanning and recognition of the target image, and obtains a scanning and recognition result. FIG. 7 illustrates an example of the flow of a method of scanning and recognizing a target image which can be carried out by the other terminal.

According to some embodiments, the mobile terminal can obtain the scanning and recognition result from the other terminal only after a verification process. According to some other embodiments, a verification process is available but optional. Methods of verification and examples of the verification processes have been described in detail hereinabove.

Step 1703: the other terminal sends the scanning and recognition result to the mobile terminal.

Step 1704: the mobile terminal receives the scanning and recognition result. According to some embodiments, the mobile terminal can display the scanning and recognition result upon receiving it. According to some embodiments, the mobile terminal can automatically display the scanning and recognition result upon receiving it. According to some other embodiments, the mobile terminal can prompt the user of the mobile terminal to decide whether to view the scanning and recognition result and display it only upon a positive command from the user.

According to some embodiments, a mobile terminal allows a user to edit the scanning and recognition result upon receiving it. FIG. 8 illustrates an example of the flow of a method of editing a scanning and recognition result by a user on a mobile terminal. According to some embodiments, a mobile terminal can automatically open an edit interface upon receiving the scanning and recognition result. According to some other embodiments, the mobile terminal can prompt the user of the mobile terminal to decide whether to edit the scanning and recognition result and opens the edit interface only upon a positive command from the user.

Step 1705: the mobile terminal sends to the other terminal an electronic document generating request comprising the scanning and recognition result. In those embodiments where the scanning and recognition result has been edited by a user, the mobile terminal can send to the server an electronic document generating request comprising the edited scanning and recognition result.

Step 1706: the other terminal generates an electronic document in accordance with the scanning and recognition result (or the edited scanning and recognition result, as the case may be). According to some embodiments, the other terminal can generate an electronic document in accordance with a scanning and recognition result (or an edited scanning and recognition result, as the case may be) in a pre-set, default format. According to some other embodiments, the other terminal can generate an electronic document in accordance with a scanning and recognition result (or an edited scanning and recognition result, as the case may be) in a format selected by a user. According to these embodiments, the selection of the document format can be included in the electronic document generating request sent from the mobile terminal to the other terminal. According to some other embodiments, selection of the document format can be pre-set in the other terminal by default.

According to some embodiments, the mobile terminal can obtain the electronic document from the other terminal only after a verification process. According to some other embodiments, a verification process is available but optional. A verification process provides an opportunity to deny the electronic document generating request from a mobile terminal if the mobile terminal does not meet one or more criteria. Therefore, the verification process can add an additional layer of security in that even if a user has obtained a scanning and recognition result, she still cannot obtain the electronic document from the other terminal unless and until the mobile terminal has met the one or more criteria. According to some embodiments, the verification criteria can comprise identification information of the mobile terminal. According to some other embodiments, the verification criteria can comprise the mobile terminal's account login information. According to some embodiments, the verification process can be carried out by the same terminal that has both scanning and recognition capability and electronic document generating capability.

According to some embodiments, an electronic document generating request can comprise identification information of a mobile terminal. According to these embodiments, in the process of obtaining an electronic document, the other terminal can verify whether the identification information of the mobile terminal entitles the mobile terminal to obtain the electronic document, and obtain the electronic document when and only when the verification result is positive.

According to some other embodiments, an electronic document generating request can comprise the mobile terminal's account login information. In these embodiments, in the process of obtaining an electronic document, the other terminal can verify whether the account logged in from the mobile terminal has authority to obtain the electronic document, and obtain the electronic document when and only when the verification result is positive.

An example verification process by the other terminal based on identification information can be as follows: when the electronic document generating request comprises identification information of the mobile terminal, the other terminal receives the electronic document generating request and, in accordance with the electronic document generating request, verifies whether the identification information matches information stored on the other terminal or is within a whitelist configured for the other terminal. When and only when the result of the verification is positive, the other terminal generates the electronic document.

An example verification process by the other terminal based on a terminal's account login information can be as follows: when the electronic document generating request comprises the mobile terminal's account login information, the other terminal receives the electronic document generating request and, in accordance with the electronic document generating request, verifies whether the account logged in from the mobile terminal entitles the mobile terminal to obtain the electronic document. When and only when the verification result is positive, the other terminal generates the electronic document.

The account login information can include single account login information or group account login information. In some example embodiments, if the mobile terminal and the other terminal are two physically separate devices, a user can log in account A on the mobile terminal and can also log in account A on the other terminal. If account A is a single account, then during the verification process, the other terminal will know that the same account has been logged in using both the mobile terminal and the other terminal. In some other example embodiments, a user can log in account a1 one the mobile terminal, and log in account a2 on the other terminal. If accounts a1 and a2 belong to a same group account A, then during the verification process, the other terminal will know that both the mobile terminal and the other terminal have been used to log in accounts belonging to the same group account A. There are various methods to set up a group account and these methods are well known to those skilled in the art.

In accordance with the various methods to set up accounts, the other terminal can employ various principles to determine whether an account logged in from a mobile terminal entitles the mobile terminal to obtain an electronic document. By way of examples only, when the account logged in from the mobile terminal is the same as the account logged in from the other terminal, the other terminal can determine that the mobile terminal has authority to obtain the electronic document. Or, when the account logged in from the mobile terminal and the account logged in from the other terminal belong to a same group account, the other terminal can determine that the mobile terminal has authority to obtain the electronic document. Or, when the account logged in from the mobile terminal is an account within a specific whitelist configured for the other terminal, the other terminal can determine that the mobile terminal has authority to obtain the electronic document. These principles and how to apply these principles to achieve account verification are well known to those skilled in the art.

According to some embodiments, the result of a verification process is not a complete denial or allowance of an electronic document generating request. Instead, part of an electronic document generating request may be allowed and part denied. This can be achieved by associating the identification information of the mobile terminal or the mobile terminal's login information with different privileges/restrictions or different levels of privileges/restrictions. In these embodiments, the other terminal can serve as a filter rather than a gate. By way of examples only, a particular mobile terminal identification entitles the mobile terminal to obtain electronic documents in certain but not all available formats. In another example, an account logged in from a mobile terminal entitles the mobile terminal to obtain electronic documents of formats different from what the mobile terminal would be able to obtain if a different account is logged in from the mobile terminal. Accordingly, different mobile terminal identifications or different accounts can be associated with different file formats. When a mobile terminal sends an electronic document generating request comprising a file format request different from what is available to the mobile terminal or an account logged in from it, the other terminal can either deny the electronic document generating request or prompt the user to select a different file format which is available to the mobile terminal or the account. According to some embodiments, different mobile terminal identifications or different accounts can be associated with the presence or absence of, or different levels of, content filtering of an electronic document. By way of examples only, the other terminal, after obtaining an electronic document, can apply a content filter to the electronic document before sending it to the mobile terminal. Application of the content filter can be in accordance with the mobile terminal's identification or the mobile terminal's account login information contained in the electronic document generating request, and with pre-set mobile terminal identification/content filter or account/content filter association stored in the other terminal. The result of application of a content filter can be either denial of the electronic document generating request, i.e., no electronic document is sent to the mobile terminal, or a modified electronic document in which certain content (e.g., certain recognized text) has been deleted. Content filtering is particularly useful in preventing persons of a certain age group from accessing content inappropriate for that age group, or in protecting copyright work. Methods of associating mobile terminal identifications and/or accounts with different privileges/restrictions or different levels of privileges/restrictions and the principles to apply a filter on the other terminal in accordance therewith are well known to those skilled in the art.

Step 1707: the other terminal sends the generated electronic document to the mobile terminal. The mobile terminal can then perform a number of operations with regard to the received electronic document. Such operations are well known to those skilled in the art, some of which have been described in detail hereinabove.

Those skilled in the art will readily appreciate that, the other terminal described immediately above does not have to have received a scanning and recognition request and have sent a scanning and recognition result before receiving an electronic document generating request. That is, steps 1705-1707 can be performed by the other terminal independently of steps 1701-1704. Accordingly, according to some embodiments, the other terminal does not have to have the capability to carry out the actions required of the other terminal in steps 1701-1704, as long as it can carry out the actions required of the other terminal in steps 1705-1707.

Figure 18:
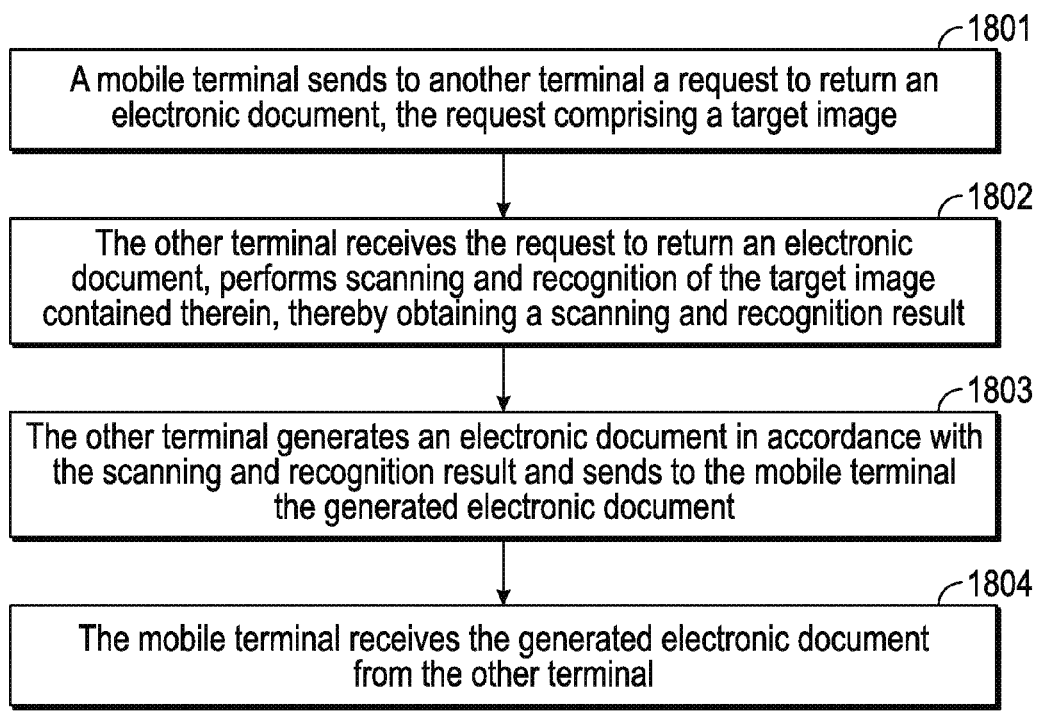
FIG. 18 is a schematic diagram illustrating an example of the flow of a method of generating electronic documents according to various embodiments.

FIG. 18 is a schematic diagram illustrating yet another example of the flow of a method of generating electronic documents according to various embodiments. The method can comprise the following steps.

Step 1801: a mobile terminal sends to another terminal a request to return an electronic document, the request comprising a target image.

Step 1802: the other terminal receives the request to return an electronic document, performs scanning and recognition of the target image contained therein, thereby obtaining a scanning and recognition result. FIG. 7 illustrates an example of the flow of a method of scanning and recognizing a target image which can be carried out by the other terminal.

Step 1803: the other terminal generates an electronic document in accordance with the scanning and recognition result and sends to the mobile terminal the generated electronic document. According to some embodiments, the other terminal can generate an electronic document in accordance with a scanning and recognition result in a pre-set, default format. According to some other embodiments, the other terminal can generate an electronic document in accordance with a scanning and recognition result in a format selected by a user. According to these embodiments, the selection of the document format can be included in the request to return an electronic document sent from the mobile terminal to the other terminal. According to some other embodiments, selection of the document format can be pre-set in the other terminal by default.

According to some embodiments, the mobile terminal can obtain the electronic document from the other terminal only after a verification process. According to some other embodiments, a verification process is available but optional. A verification process provides an opportunity to deny a mobile terminal's request to return an electronic document if the mobile terminal does not meet one or more criteria. Therefore, the verification process can add an additional layer of security in that even if a user has obtained access to a mobile terminal, she still cannot obtain the electronic document from the other terminal unless and until the mobile terminal has met the one or more criteria. According to some embodiments, the verification criteria can comprise identification information of the mobile terminal. According to some other embodiments, the verification criteria can comprise the mobile terminal's account login information. According to some embodiments, the verification process can be carried out by a server. According to some embodiments, the verification process can be carried out by the other terminal that obtains the scanning and recognition result and generates the electronic document.

According to some embodiments, a request to return an electronic document can comprise identification information of a mobile terminal. According to these embodiments, in the process of obtaining an electronic document, the other terminal can verify whether the identification information of the mobile terminal entitles the mobile terminal to obtain the electronic document, and sends the electronic document to the mobile terminal when and only when the verification result is positive.

According to some other embodiments, a request to return an electronic document can comprise the mobile terminal's account login information. In these embodiments, in the process of generating an electronic document, the other terminal can verify whether the account logged in from the mobile terminal has authority to obtain the electronic document, and generate the electronic document when and only when the verification result is positive.

An example verification process by the other terminal based on identification information can be as follows: when the request to return an electronic document comprises identification information of the mobile terminal, the other terminal receives the request and, in accordance with the request, verifies whether the identification information matches information stored on the other terminal or is within a whitelist configured for the other terminal. When and only when the result of the verification is positive, the other terminal sends the electronic document to the mobile terminal.

An example verification process by the other terminal based on a terminal's account login information can be as follows: when the request to return an electronic document comprises the mobile terminal's account login information, the other terminal receives the request and, in accordance with the request, verifies whether the account logged in from the mobile terminal entitles the mobile terminal to obtain the electronic document. When and only when the verification result is positive, the server sends the electronic document to the mobile terminal.

The account login information can include single account login information or group account login information. In some example embodiments, if the mobile terminal and the other terminal are two physically separate devices, a user can log in account A on the mobile terminal and can also log in account A on the other terminal. If account A is a single account, then during the verification process, the other terminal will know that the same account has been logged in using both the mobile terminal and the other terminal. In some other example embodiments, a user can log in account a1 one the mobile terminal, and log in account a2 on the other terminal. If accounts a1 and a2 belong to a same group account A, then during the verification process, the other terminal will know that both the first terminal and the second terminal have been used to log in accounts belonging to the same group account A. There are various methods to set up a group account and these methods are well known to those skilled in the art.

In accordance with the various methods to set up accounts, the other terminal can employ various principles to determine whether an account logged in from a mobile terminal entitles the mobile terminal to obtain an electronic document. By way of examples only, when the account logged in from the mobile terminal is the same as the account logged in from the other terminal, the other terminal can determine that the mobile terminal has authority to obtain the electronic document. Or, when the account logged in from the mobile terminal and the account logged in from the other terminal belong to a same group account, the other terminal can determine that the mobile terminal has authority to obtain the electronic document. Or, when the account logged in from the mobile terminal is an account within a specific whitelist configured for the other terminal, the other terminal can determine that the mobile terminal has authority to obtain the electronic document. These principles and how to apply these principles to achieve account verification are well known to those skilled in the art.

According to some embodiments, the result of a verification process is not a complete denial or allowance of a request to return an electronic document. Instead, part of a scanning and recognition request may be allowed and part denied. This can be achieved by associating the identification information of the mobile terminal or the mobile terminal's login information with different privileges/restrictions or different levels of privileges/restrictions. In these embodiments, the other terminal can serve as a filter rather than a gate. By way of examples only, a particular mobile terminal identification entitles the mobile terminal to send target images of larger sizes than other mobile terminals. In another example, an account logged in from a mobile terminal entitles the mobile terminal to send target images of larger sizes than it would be able to if a different account is logged in the mobile terminal. According to some embodiments, different mobile terminal identifications or different accounts can be associated with different file size limitations imposed on target images sent to the other terminal. When a mobile terminal sends a request to return an electronic document and the request comprises a target image that exceeds the file size limitation imposed on the mobile terminal or an account logged in from it, the other terminal can either deny the scanning and recognition request or request that a smaller-sized target image be sent to the other terminal. If a mobile terminal sends more than one target image at a time and the combined size of all the target images sent to the other terminal exceeds a size limitation associated with the mobile terminal or an account logged in from it, the other terminal can either deny the scanning and recognition request, or proceed with obtaining scanning and recognition results for only some but not all of the target images sent to it. The criteria for such selection are well known to those skilled in the art. For example, the other terminal can receive target images contained in a scanning and recognition request in chronological order until the size limitation has been exceeded, and proceed with obtaining the scanning and recognition results of all the target images already received prior to the one that caused the size limitation to be exceeded. By way of examples only, a particular mobile terminal identification can entitle the mobile terminal to obtain electronic documents in certain but not all available formats. In another example, an account logged in from a mobile terminal can entitle the mobile terminal to obtain electronic documents of formats different from what the mobile terminal would be able to obtain if a different account is logged in from the mobile terminal. Accordingly, different mobile terminal identifications or different accounts can be associated with different file formats. When a mobile terminal sends a request to return an electronic document comprising a file format request different from what is available to the mobile terminal or an account logged in from it, the other terminal can either deny the request to return an electronic document or prompt the user to select a different file format which is available to the mobile terminal or the account. According to some embodiments, different mobile terminal identifications or different accounts can be associated with the presence or absence of, or different levels of, content filtering of a scanning and recognition result or of a generated electronic document. By way of examples only, the other terminal, after obtaining a scanning and recognition result, or after generating an electronic document in accordance with the scanning and recognition result, can apply a content filter to the scanning and recognition result or the electronic document. Application of the content filter can be in accordance with the mobile terminal's identification or the mobile terminal's account login information contained in the scanning and recognition request, and with pre-set mobile terminal identification/content filter or account/content filter association stored in the other terminal. The result of application of a content filter can be either denial of the request to return an electronic document, i.e., no electronic document is sent to the mobile terminal, or a modified electronic document from what would have been generated if no filter has been applied, in which certain content (e.g., certain recognized text) has been modified, e.g., deleted. Content filtering is particularly useful in preventing persons of a certain age group from accessing content inappropriate for that age group, or in protecting copyright work. Methods of associating mobile terminal identifications and/or accounts with different privileges/restrictions or different levels of privileges/restrictions and the principles to apply a filter on the other terminal in accordance therewith are well known to those skilled in the art.

Step 1804: the mobile terminal receives the generated electronic document from the other terminal. The mobile terminal can then perform a number of operations with regard to the received electronic document. Such operations are well known to those skilled in the art, some of which have been described in detail hereinabove.

Figure 19A:
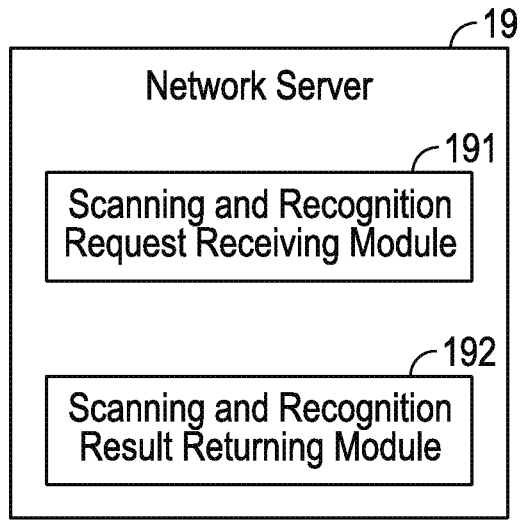
FIGS. 19A-19D are schematic diagrams illustrating examples of arrangements of a network server according to various embodiments.

FIG. 19A is a schematic diagram illustrating an example of an arrangement of a network server according to various embodiments, the network server 19 comprising: a scanning and recognition request receiving module 191, configured to receive a scanning and recognition request sent from a mobile terminal, the scanning and recognition request comprising a target image; and a scanning and recognition result returning module 192, configured to obtain a scanning and recognition result in accordance with the target image contained in the scanning and recognition request, and to send to the mobile terminal the scanning and recognition result. Similar to a scanning and recognition module in a mobile terminal, the scanning and recognition result returning module 192 can comprise at least one of a text recognition unit and a scanning and recognition result obtaining unit. According to some embodiments, the text recognition unit can be configured to call an algorithm for OCR to recognize text in the target image and obtain text information therefrom. According to some embodiments, the scanning and recognition result obtaining unit can be configured to obtain a scanning and recognition result in accordance with the target image from a terminal. According to some embodiments, in addition to the text recognition unit, the scanning and recognition result returning module 192 can comprise a typeset position recording unit, configured to record typeset position of text in a target image, and a typesetting unit configured to typeset the text information obtained by the text recognition unit in accordance with the typeset position of the corresponding text in the target image as recorded by the typeset position recording unit.

Figure 19B:
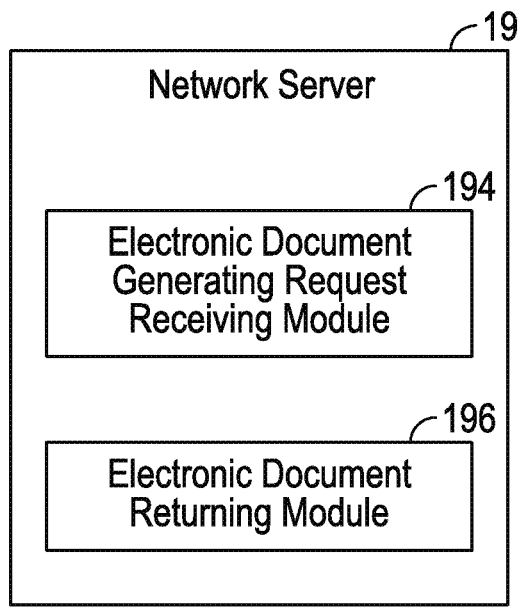

FIG. 19B is a schematic diagram illustrating another example of an arrangement of a network server according to various embodiments, the network server 19 comprising: an electronic document generating request receiving module 194, configured to receive an electronic document generating request from a mobile terminal, the electronic document generating request comprising a scanning and recognition result; and an electronic document returning module 196, configured to generate an electronic document or obtain from a terminal an electronic document generated by the terminal in accordance with the scanning and recognition result, and to send the generated electronic document to the mobile terminal. Similar to an electronic document generating module in a mobile terminal, the electronic document returning module 196 can comprise at least one of a document generating unit and an electronic document obtaining unit. According to some embodiments, the document generating unit can be configured to generate an electronic document in accordance with the scanning and recognition result. According to some embodiments, the electronic document obtaining unit can be configured to obtain an electronic document in accordance with the scanning and recognition result from a terminal.

Figure 19C:
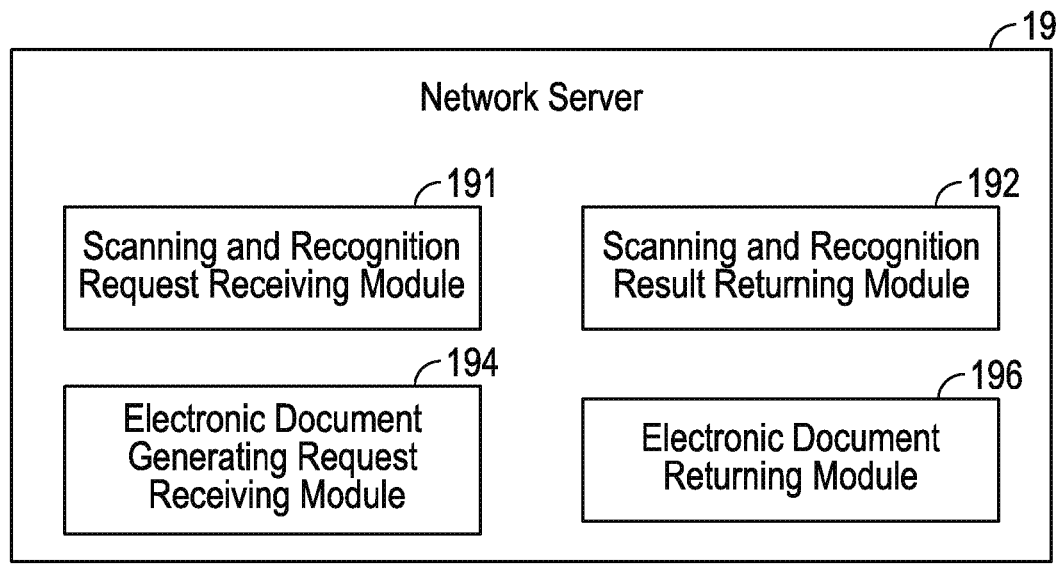

FIG. 19C is a schematic diagram illustrating yet another example of an arrangement of a network server according to various embodiments. In addition to scanning and recognition request receiving module 191 and scanning and recognition result returning module 192, the network server comprises: an electronic document generating request receiving module 194, configured to receive an electronic document generating request from a mobile terminal, the electronic document generating request comprising a scanning and recognition result; and an electronic document returning module 196, configured to generate an electronic document or obtain from a terminal an electronic document generated by the terminal in accordance with the scanning and recognition result, and to send the generated electronic document to the mobile terminal.

Figure 19D:
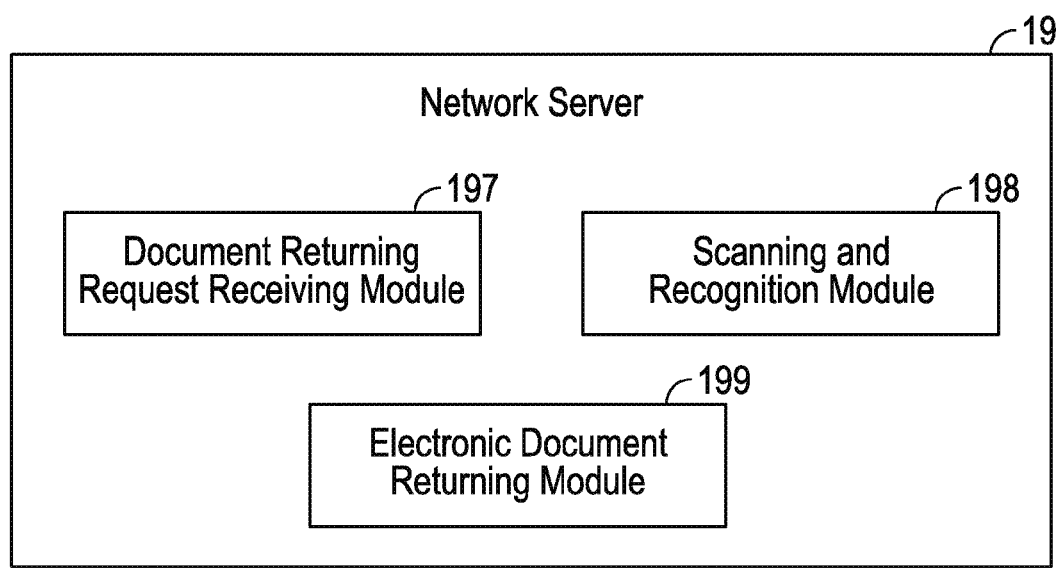

FIG. 19D is a schematic diagram illustrating still another example of an arrangement of a network server according to various embodiments, the network server 19 comprising: a document returning request receiving module 197, configured to receive from a mobile terminal a request to return an electronic document, the request to return an electronic document comprising a target image; a scanning and recognition module 198, configured to obtain a scanning and recognition result in accordance with the target image, either by scanning and recognizing image and text in the target image or by obtaining a scanning and recognition result in accordance with the target image from a terminal; and an electronic document returning module 199, configured to generate an electronic document or obtain from a terminal an electronic document generated by the terminal in accordance with the scanning and recognition result, and to send the generated electronic document to the mobile terminal.

According to some embodiments, a scanning and recognition request can additionally comprise a mobile terminal's account login information or identification information. Accordingly, the network servers illustrated in FIGS. 19A and 19C can each further comprise: a scanning and recognition request verification module, configured to verify, in accordance with the scanning and recognition request, whether the mobile terminal has authority to obtain, or have the server generate, the scanning and recognition result. When and only when the result of the verification is positive, the scanning and recognition result returning module is started and obtains the scanning and recognition result.

According to some embodiments, an electronic document generating request can additionally comprise a mobile terminal's account login information or identification information. Accordingly, the network servers illustrated in FIGS. 19B-19C can each further comprise: an electronic document generating request verification module, configured to verify, in accordance with the electronic document generating request, whether the mobile terminal has authority to obtain the electronic document. When and only when the result of the verification is positive, the electronic document returning module is started and generates the electronic document.

According to some embodiments, a request to return an electronic document can additionally comprise a mobile terminal's account login information or identification information. Accordingly, the network server illustrated in FIG. 19D can further comprise: an electronic document returning request verification module, configured to verify, in accordance with the request to return an electronic document, whether the mobile terminal has authority to obtain the electronic document. When and only when the result of the verification is positive, the scanning and recognition module and the electronic document generating module are started to generate the electronic document based on the target image contained in the request to return an electronic document.

Figure 20A:
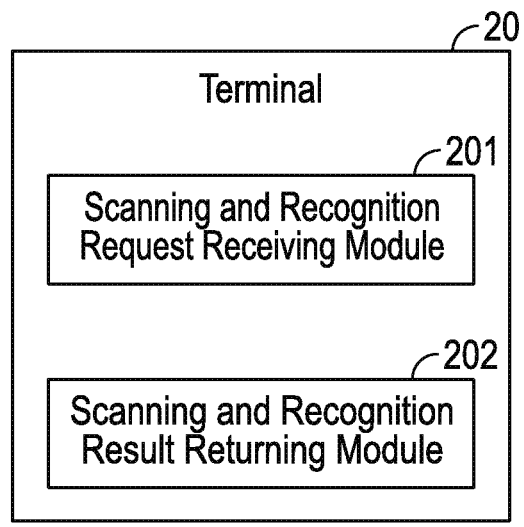
FIGS. 20A-20D are schematic diagrams illustrating examples of arrangements of a terminal according to various embodiments.

FIG. 20A is a schematic diagram illustrating an example of an arrangement of a terminal according to various embodiments, the terminal 20 comprising: a scanning and recognition request receiving module 201, configured to receive a scanning and recognition request sent from a mobile terminal, either directly or via a server, the scanning and recognition request comprising a target image; and a scanning and recognition result returning module 202, configured to obtain a scanning and recognition result in accordance with the target image contained in the scanning and recognition request, and to send to the mobile terminal the scanning and recognition result, either directly or via a server. According to some embodiments, the scanning and recognition result returning module 202 can comprise a text recognition unit. According to some embodiments, the text recognition unit can be configured to call an algorithm for OCR to recognize text in the target image and obtain text information therefrom. According to some embodiments, in addition to the text recognition unit, the scanning and recognition result returning module 202 can comprise a typeset position recording unit, configured to record typeset position of text in a target image, and a typesetting unit configured to typeset the text information obtained by the text recognition unit in accordance with the typeset position of the corresponding text in the target image as recorded by the typeset position recording unit.

Figure 20B:
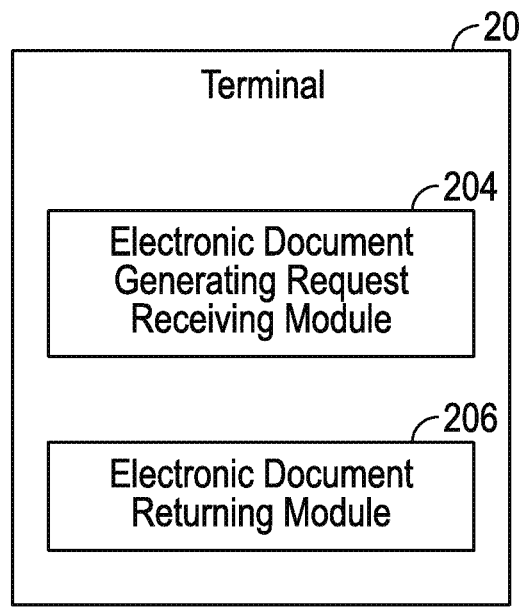

FIG. 20B is a schematic diagram illustrating another example of an arrangement of a terminal according to various embodiments, the terminal 20 comprising: an electronic document generating request receiving module 204, configured to receive an electronic document generating request from a mobile terminal, either directly or via a server, the electronic document generating request comprising a scanning and recognition result; and an electronic document returning module 206, configured to generate an electronic document in accordance with the scanning and recognition result, and to send the generated electronic document to the mobile terminal, either directly or via a server. According to some embodiments, the electronic document returning module 206 can comprise a document generating unit. According to some embodiments, the document generating unit can be configured to generate an electronic document in accordance with the scanning and recognition result.

Figure 20C:
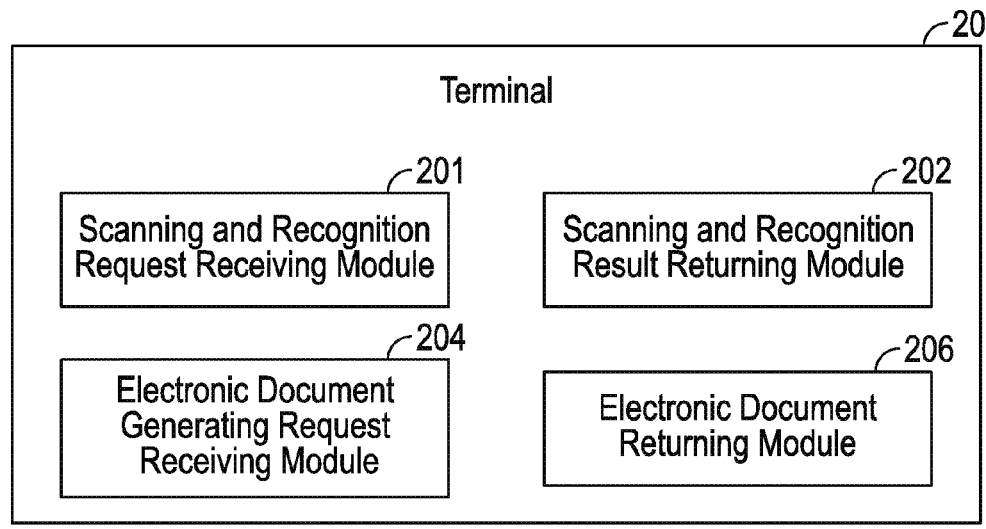

FIG. 20C is a schematic diagram illustrating yet another example of an arrangement of a terminal according to various embodiments. In addition to scanning and recognition request receiving module 201 and scanning and recognition result returning module 202, the terminal comprises: an electronic document generating request receiving module 204, configured to receive an electronic document generating request from a mobile terminal, either directly or via a server, the electronic document generating request comprising a scanning and recognition result; and an electronic document returning module 206, configured to generate an electronic document in accordance with the scanning and recognition result, and to send the generated electronic document to the mobile terminal.

Figure 20D:
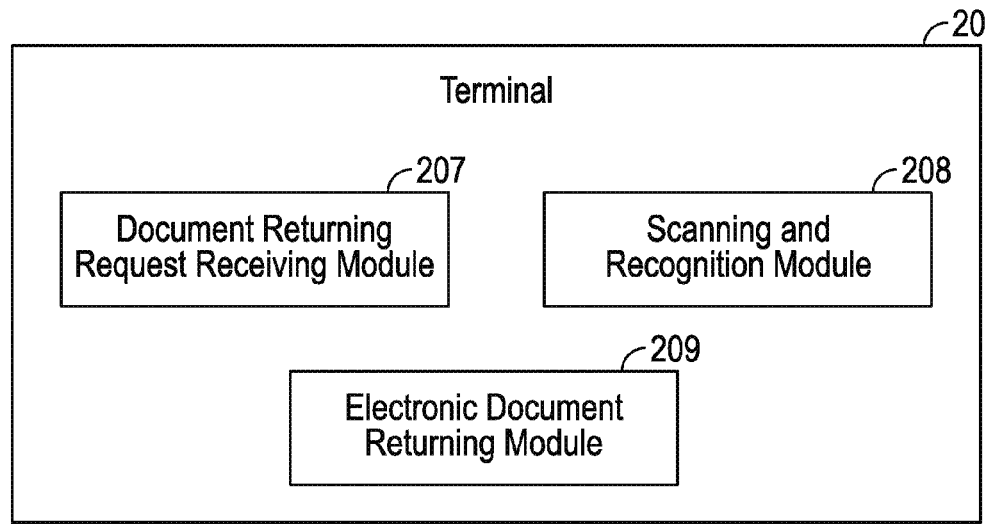

FIG. 20D is a schematic diagram illustrating still another example of an arrangement of a terminal according to various embodiments, the terminal 20 comprising: a document returning request receiving module 207, configured to receive from a mobile terminal, either directly or via a server, a request to return an electronic document, the request to return an electronic document comprising a target image; a scanning and recognition module 208, configured to obtain a scanning and recognition result in accordance with the target image by scanning and recognizing image and text in the target image; and an electronic document returning module 209, configured to generate an electronic document in accordance with the scanning and recognition result, and to send the generated electronic document to the mobile terminal, either directly or via a server.

According to some embodiments, a scanning and recognition request can additionally comprise a mobile terminal's account login information or identification information. Accordingly, the terminals illustrated in FIGS. 20A and 20C can each further comprise: a scanning and recognition request verification module, configured to verify, in accordance with the scanning and recognition request, whether the mobile terminal has authority to obtain the scanning and recognition result. When and only when the result of the verification is positive, the scanning and recognition result returning module is started and obtains the scanning and recognition result.

According to some embodiments, an electronic document generating request can additionally comprise a mobile terminal's account login information or identification information. Accordingly, the terminals illustrated in FIGS. 20B-20C can each further comprise: an electronic document generating request verification module, configured to verify, in accordance with the electronic document generating request, whether the mobile terminal has authority to obtain the electronic document. When and only when the result of the verification is positive, the electronic document generating module is started and generates the electronic document.

According to some embodiments, a request to return an electronic document can additionally comprise a mobile terminal's account login information or identification information. Accordingly, the terminal illustrated in FIG. 20D can further comprise: an electronic document returning request verification module, configured to verify, in accordance with the request to return an electronic document, whether the mobile terminal has authority to obtain the electronic document. When and only when the result of the verification is positive, the scanning and recognition module and the electronic document generating module are started to generate the electronic document based on the target image contained in the request to return an electronic document.

Those skilled in the art can readily appreciate that when one or both of the scanning and recognition function and the electronic document generating function can be carried out by a server or another terminal, as described above, a mobile terminal does not have to have a scanning and recognition module, or an electronic document generating module, or any of those modules, in order to achieve the result of obtaining an electronic document based on a target image. According to some embodiments, a mobile terminal can comprise a login module configured to log in a corresponding account. When the mobile terminal sends a scanning and recognition request, or an electronic document generating request, or a request to return an electronic document, to a server or to another terminal, either via a server or directly, the request can carry the account login information, whereby the server, or the other terminal, as the case may be, can verify, based on the account login information, whether the mobile terminal has authority to achieve the requested result.

Because secure transfer of data is desirable in certain circumstances, according to some embodiments, one or more of the following can be encrypted prior to being sent from a terminal or a server, as applicable: a target image, a scanning and recognition result, and an electronic document. According to these embodiments, in order for the recipient of the encrypted information to further process the information, the recipient can have corresponding decryption functions.

According to some embodiments, a mobile terminal can have an encryption/decryption module that encrypts a target image before sending it to a server or another terminal (either directly or via a server) for scanning and recognition. The server (or the other terminal) can have an encryption/decryption module that decrypts the encrypted target image before obtaining a scanning and recognition result in accordance with the decrypted target image. If the server (or the other terminal) has a scanning and recognition request verification module that verifies whether the mobile terminal has authority to obtain the scanning and recognition result, then the decryption can occur either before or after the verification, but preferably after the verification. After the server (or the other terminal) obtains the scanning and recognition result, the server (or other terminal) can use its encryption/decryption module to encrypt the scanning and recognition result before sending it to the mobile terminal (in the case of the other terminal, either directly or via a server). The mobile terminal can then use its own encryption/decryption module to decrypt the received scanning and recognition result.

According to some embodiments, a mobile terminal can have an encryption/decryption module that encrypts a scanning and recognition result before sending it to a server or another terminal (either directly or via a server) to generate an electronic document in accordance therewith. The server (or the other terminal) can have an encryption/decryption module that decrypts the encrypted scanning and recognition result before generating an electronic document in accordance therewith. If the server (or the other terminal) has an electronic document generation request verification module that verifies whether the mobile terminal has authority to obtain the electronic document, then the decryption can occur either before or after the verification, but preferably after the verification. After the server (or the other terminal) generates the electronic document, the server (or other terminal) can use its encryption/decryption module to encrypt the electronic document before sending it to the mobile terminal (in the case of the other terminal, either directly or via a server). The mobile terminal can then use its own encryption/decryption module to decrypt the received electronic document.

According to some embodiments, a mobile terminal can have an encryption/decryption module that encrypts a target image before sending it to a server or another terminal (either directly or via a server) to obtain an electronic document in accordance therewith. The server (or the other terminal) can have an encryption/decryption module that decrypts the encrypted target image before obtaining a scanning and recognition result in accordance with the decrypted target image. If the server (or the other terminal) has an electronic document returning request verification module that verifies whether the mobile terminal has authority to obtain the electronic document, then the decryption can occur either before or after the verification, but preferably after the verification. After the server (or the other terminal) obtains the scanning and recognition result and generates an electronic document in accordance with the scanning and recognition result, the server (or other terminal) can use its encryption/decryption module to encrypt the electronic document before sending it to the mobile terminal (in the case of the other terminal, either directly or via a server). The mobile terminal can then use its own encryption/decryption module to decrypt the received electronic document.

Once an electronic document has been generated or obtained by a mobile terminal, a number of follow-up operations can be performed on the electronic document by the mobile terminal. For example, the mobile terminal can synchronize the electronic document with a server, e.g., a cloud server, by uploading the electronic document to a cloud space in a server, thereby allowing a user to obtain the electronic document from the cloud space in the server by logging in a related account from a different terminal than the mobile terminal from which the electronic document has been uploaded. A user can also share the electronic document in a number of ways, e.g., sharing it with friends on instant messaging applications such as QQ or WeChat, publishing it on a social networking platform such as Tencent microblog or Sina microblog or any other space in a social networking website, or by sharing it with contacts stored in the mobile terminal, either by e-mail or by any method of file transfer via the Internet well known to those skilled in the art. If the electronic document is in an editable format, the user can also edit it before uploading it or sharing it with others.

Figure 21:
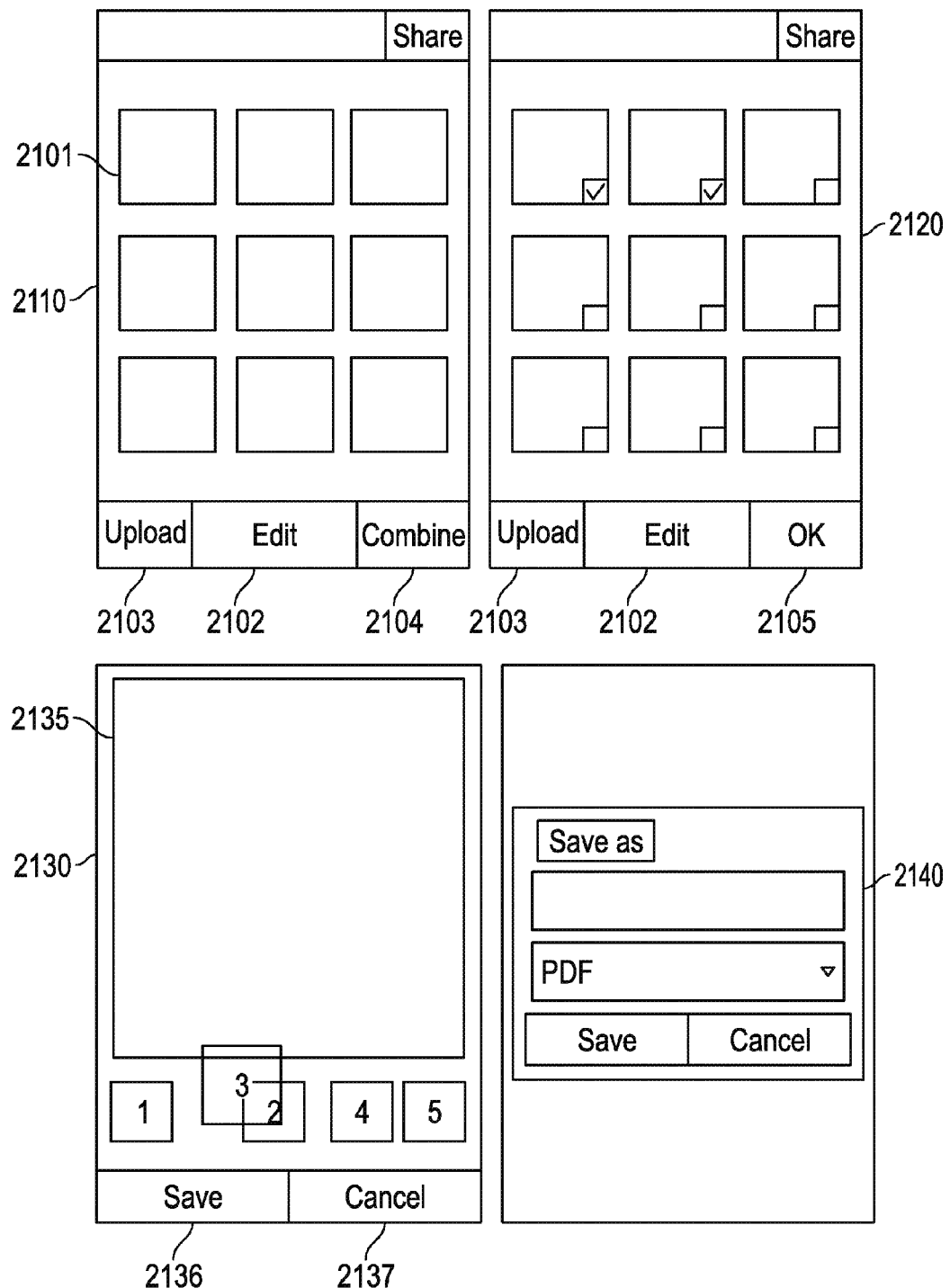
FIG. 21 is an example of user interfaces allowing a user to combine multiple electronic documents in accordance with various embodiments.

According to some embodiments, an electronic document either obtained or generated by a mobile terminal based on a target image can be combined with one or more other electronic documents (either similarly obtained or generated by the mobile terminal based on target images or otherwise) before a user uploads or shares the combined electronic document. FIG. 21 is an example of user interfaces allowing a user to combine multiple electronic documents. A mobile terminal can display a number of electronic documents 2101 in a display interface 2110, which also displays a number of control buttons, such as edit button 2102, upload button 2103, and combine button 2104. Once any of these buttons is pressed, a selection interface 2120 replaces the display interface 2110 and allows a user to select one or more of the electronic documents being displayed. Once at least one of the electronic documents is selected, the button the pressing of which triggered the selection interface 2120 turns into a confirmation button 2105 (shown in FIG. 21, the combine button 2104 turns into the confirmation button 2105). Once the confirmation button 2105 is pressed, an operation interface 2130 replaces the selection interface 2120, allowing the user to perform the operation she chose by pressing one of the control buttons. As illustrated in FIG. 21, the combine button 2104 was pressed and the operation interface 2130 is a combine interface, in which the selected electronic documents are arranged next to each other, numbered, and displayed as thumbnails 2106. The user can change the order of them by dragging and dropping certain thumbnails, above which in the operation interface 2130 is a preview area 2135, where an electronic document can be previewed by pressing a thumbnail corresponding to it. According to some embodiments, a specific electronic document can be edited by pressing its preview in the operation interface 2130. Below the thumbnails 2106 in the operation interface 2130 are buttons that allow a user to save the combined electronic document 2136 or abort the combination operation 2137. Once a user chooses to save the combined electronic document, a window 2140 can pop up for the user to enter the name of the electronic document to be saved and to choose the format of the electronic document (illustrated in FIG. 21 as a PDF document).

According to some embodiments, by scanning and recognizing a target image using a mobile terminal, a user can generate electronic documents based on information she obtains on the go whenever and wherever. This greatly enhances the user's capability to obtain and retain information when traveling.

Although embodiments disclosed herein may be described and illustrated herein in terms of a mobile terminal obtaining a target image for the generation of an electronic document based thereon, it should be understood that the embodiments are not so limited, but can be additionally applicable to any terminal, include non-mobile terminals that can capture and/or store image files. Furthermore, although "another terminal" or "the other terminal" referred to herein may be described and illustrated herein in terms of a non-mobile terminal, it should be understood that some embodiments can include mobile terminals as the other terminal, as long as the mobile terminal has the capability of obtaining scanning and recognition results in accordance with target images and/or generating electronic documents in accordance with the scanning and recognition results.

Persons of ordinary skill in the art can readily appreciate that all or part of the steps of the methods described in the embodiments above can be executed by relevant hardware instructed by a program that may be stored in a computer-readable memory medium. The readable memory medium may be, for example, a read-only memory ("ROM"), a random access memory ("RAM"), a magnetic disk or a compact disc.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A mobile terminal of comprising:
    a target image obtaining module, configured to obtain a target image to be scanned and recognized,
    a scanning and recognition module, configured to obtain a scanning and recognition result in accordance with the target image, and
    an electronic document generating module, configured to obtain an electronic document in accordance with the scanning and recognition result,
    wherein the electronic document generating module comprises at least one of:
        a document generating unit, configured to generate the electronic document in accordance with the scanning and recognition result, and
        an electronic document generating communication unit, configured to send an electronic document generating request comprising the scanning and recognition result to a server or another terminal, and to receive from the server or the other terminal the electronic document generated by the server or the other terminal in accordance with the scanning and recognition result.

2. A mobile terminal comprising:
    a target image obtaining module, configured to obtain a target image to be scanned and recognized,
    a scanning and recognition module, configured to obtain a scanning and recognition result in accordance with the target image,
    an electronic document generating module, configured to obtain an electronic document in accordance with the scanning and recognition result, and an editing module, configured to display the scanning and recognition result, and to edit the scanning and recognition result in accordance with one or more edit operations obtained from a user.

3. The mobile terminal of claim 2, wherein the editing module comprises:
   a comparison displaying unit, configured to display a comparison interface comparing the scanning and recognition result of the target image to the target image,
   an edit operation obtaining unit, configured to obtain from the user the one or more edit operations specific to the scanning and recognition result, and
   an editing unit, configured to edit the scanning and recognition result in accordance with the one or more edit operations obtained by the edit operation obtaining unit.

4. A method of generating an electronic document for a mobile terminal, the method comprising:
   obtaining a target image to be scanned and recognized,
   obtaining a scanning and recognition result in accordance with the target image, and
   generating the electronic document in accordance with the scanning and recognition result, wherein obtaining the scanning and recognition result comprises:
      calling an algorithm for OCR to recognize text in the target image an obtain text information therefrom,
      recording typeset position of the text in the target image, and
      typesetting the text information in accordance with the recorded typeset position of the corresponding text in the target image.

5. A method of generating an electronic document for a mobile terminal, the method comprising:
   obtaining a target image to be scanned and recognized,
   obtaining a scanning and recognition result in accordance with the target image,
   displaying the scanning and recognition result,
   editing the scanning and recognition result in accordance with one or more edit operations obtained from a user, and
   generating the electronic document in accordance with the edited scanning and recognition result,
   wherein obtaining the scanning and recognition result comprises calling an algorithm for OCR to recognize text in the target image and obtain text information therefrom, and editing the scanning and recognition result comprises editing the text information obtained from the target image.

6. The method of claim 5, wherein editing the scanning and recognition result comprises:
   displaying a comparison interface comparing the scanning and recognition result of the target image to the target image,
   obtaining from the user the one or more edit operations specific to the scanning and recognition result, and
   editing the scanning and recognition result in accordance with the obtained one or more edit operations.

7. A method of generating an electronic document for a mobile terminal, the method comprising:
   receiving from the mobile terminal a scanning and recognition request comprising a target image,
   obtaining a scanning and recognition result in accordance with the target image, and
   sending the scanning and recognition result to the mobile terminal, thereby allowing the mobile terminal to generate the electronic document in accordance with the scanning and recognition result.

8. The method of claim 7, wherein obtaining the scanning and recognition result comprises:
   obtaining the scanning and recognition result from another terminal.

9. The method of claim 7 comprising, after receiving the scanning and recognition request and before obtaining the scanning and recognition result,
   verifying that the mobile terminal has authority to obtain the scanning and recognition result.

10. The method of claim 7, wherein obtaining the scanning and recognition result comprises:
    calling an algorithm for OCR to recognize text in the target image and obtain text information therefrom.

11. The method of claim 7 comprising, after sending the scanning and recognition result to the mobile terminal,
    receiving from the mobile terminal an electronic document generating request comprising an edited scanning and recognition result,
    obtaining an electronic document in accordance with the edited scanning and recognition result, and
    sending the obtained electronic document to the mobile terminal.

12. The method of claim 11, wherein obtaining the electronic document comprises:
    obtaining from another terminal the electronic document generated by the other terminal in accordance with the scanning and recognition result.

13. The method of claim 11 comprising, after receiving the electronic document generating request and before obtaining the electronic document,
    verifying that the mobile terminal has authority to obtain the electronic document.

14. A mobile terminal comprising:
    a target image obtaining module, configured to obtain a target image to be scanned and recognized,
    a scanning and recognition module, configured to obtain a scanning and recognition result in accordance with the target image, and
    an electronic document generating module, configured to obtain an electronic document in accordance with the scanning and recognition result,
    wherein the scanning and recognition module comprises at least one of:
       a text recognition unit, configured to call an algorithm for OCR to recognize text in the target image and to obtain text information therefrom, and
       a scanning and recognition communication unit, configured to send a scanning and recognition request comprising the target image to a server or another terminal, and to receive the scanning and recognition result sent from the server or the other terminal.

15. The mobile terminal of claim 14, wherein the scanning and recognition module comprises:
    a typeset position recording unit, configured to record typeset position of the text in the target image, and
    a typesetting unit, configured to typeset the text information obtained by the text recognition unit in accordance with the typeset position of the corresponding text in the target image as recorded by the typeset position recording unit.

16. A mobile terminal comprising:
    a target image obtaining module, configured to obtain a target image to be scanned and recognized,
    a scanning and recognition module, configured to obtain a scanning and recognition result in accordance with the target image, and an electronic document generating module, configured to obtain an electronic document in accordance with the scanning and recognition result, wherein the target image obtaining module comprises at least one of:

an image selecting unit, configured to obtain at least one image selected by a user from an image library in the mobile terminal, and an image scanning unit, configured to obtain an image being currently obtained by the mobile terminal and treat the image as the target image for scanning and recognition.

* * * * *